(12) United States Patent
Perlman et al.

(10) Patent No.: US 10,902,643 B2
(45) Date of Patent: Jan. 26, 2021

(54) COLOR DETECTION ALGORITHM

(71) Applicant: Twine Solutions Ltd., Petach Tiqva (IL)

(72) Inventors: Mirta Perlman, Bet Elazari (IL); Gilad Gotesman, Netanya (IL); Ilanit Mor, Kiryat Ono (IL); Alon Moshe, Petach Tikva (IL)

(73) Assignee: Twine Solutions Ltd.

( * ) Notice: Subject to any disclaimer, the term of this patent is extended or adjusted under 35 U.S.C. 154(b) by 158 days.

(21) Appl. No.: 16/113,023

(22) Filed: Aug. 27, 2018

(65) Prior Publication Data

US 2019/0066338 A1 Feb. 28, 2019

Related U.S. Application Data

(60) Provisional application No. 62/684,207, filed on Jun. 13, 2018, provisional application No. 62/552,416, filed on Aug. 31, 2017.

(51) Int. Cl.
*G06T 7/90* (2017.01)
*G06K 9/46* (2006.01)
(Continued)

(52) U.S. Cl.
CPC .............. *G06T 7/90* (2017.01); *D06B 23/00* (2013.01); *G06K 7/10722* (2013.01); *G06K 7/1408* (2013.01); *G06K 7/1413* (2013.01); *G06K 9/4652* (2013.01); *G06K 19/0614* (2013.01); *G06K 19/06028* (2013.01); *G06T 7/62* (2017.01); *H04N 9/00* (2013.01); *D06B 2700/36* (2013.01); *G06K 2019/06225* (2013.01);
(Continued)

(58) Field of Classification Search
CPC .......... G06T 7/90; G06K 9/4652; H04N 1/60; H04N 1/6008; H04N 1/6033; H04N 1/6047; H04N 1/6058
See application file for complete search history.

(56) References Cited

U.S. PATENT DOCUMENTS 7,586,642 B2  9/2009  Chiba
8,406,482 B1  3/2013  Chien et al.
(Continued)

*Primary Examiner* — Andrew W Johns
(74) *Attorney, Agent, or Firm* — Blueshift IP, LLC; Robert Plotkin

(57) ABSTRACT

A color detection system, comprising: a card having printed thereon a color chart comprising multiple colored areas, and at least one grayscale area; a camera configured to acquire an image comprising a pixel representation a sample positioned adjacent to the card; a storage device configured to store reference data corresponding to the color chart and the at least one grayscale area; and a processor configured to: perform a grayscale correction to the pixel representation of the color chart and sample using a grayscale correction transformation between the pixel representation the grayscale area and the corresponding reference data, estimate colorimetric coordinates for the sample by applying to the respective grayscale corrected pixel representation, a transformation between the grayscale corrected pixel representation of the color chart and the corresponding colorimetric reference data, and convert the estimated colorimetric coordinates for the sample to RGB.

17 Claims, 18 Drawing Sheets
(6 of 18 Drawing Sheet(s) Filed in Color)

(51) Int. Cl.
  *G06T 7/62* (2017.01)
  *G06K 19/06* (2006.01)
  *G06K 7/10* (2006.01)
  *D06B 23/00* (2006.01)
  *G06K 7/14* (2006.01)
  *H04N 9/00* (2006.01)

(52) U.S. Cl.
  CPC ........... *G06T 2207/10024* (2013.01); *G06T 2207/20021* (2013.01); *G06T 2207/30204* (2013.01)

(56) References Cited

U.S. PATENT DOCUMENTS

| | | | |
|---|---|---|---|
| 8,634,640 B2 | 1/2014 | Bhatti et al. | |
| 8,817,329 B2 | 8/2014 | Satoh et al. | |
| 9,967,411 B2* | 5/2018 | Chung et al. | G03G 15/5075 |
| 2006/0227397 A1* | 10/2006 | Goma et al. | H04N 1/6033 358/521 |
| 2007/0223064 A1* | 9/2007 | Ichitani | H04N 1/6033 358/504 |
| 2007/0242877 A1 | 10/2007 | Peters et al. | |
| 2012/0082374 A1 | 4/2012 | Agarwal et al. | |
| 2013/0208289 A1 | 8/2013 | Satoh et al. | |
| 2013/0322750 A1 | 12/2013 | Agarwal et al. | |
| 2014/0209682 A1* | 7/2014 | Gottwals et al. | G06K 7/10544 235/454 |

\* cited by examiner

COLOR DETECTION ALGORITHM

CROSS-REFERENCE TO RELATED APPLICATIONS

This application claims the benefit of priority of U.S. Provisional Application No. 62/552,416, filed Aug. 31, 2017, and entitled "Color Detection Algorithm", the contents of which are incorporated herein by reference in their entirety, and U.S. Provisional Patent Application No. 62/684,207, filed Jun. 13, 2018, and entitled "Color Detection Algorithm", the contents of which are incorporated herein by reference in their entirety.

FIELD OF THE DISCLOSED TECHNIQUE

The disclosed technique relates to color detection in general, and to matching the color of a sample within the color gamut of a dyeing machine, in particular.

BACKGROUND OF THE DISCLOSED TECHNIQUE

Techniques for remote color detection via mobile devices are known in the art. Typically, a user acquires an image of an object via a mobile device equipped with a camera, and transmits the image to a server for subsequent color detection. Applications for such techniques range from the cosmetics industry and dentistry, to home décor, electronic display, manufacturing, and more. However, due to poor lighting, low resolution, and other distortions, accurate color detection poses a challenge.

Several color spaces exist for defining a color. The human eye is trichromatic and responds to the red, blue, and green spectra. Hence visual displays emit light in these spectra accordingly, and color for such displays are mapped onto the additive RGB (red green blue) color space. However, color printing results in the absorption of color ink by the printed media, and thus colors are mapped onto the subtractive CMYK (cyan, magenta, yellow, black) color space for these applications. Other color spaces that are commonly used include the CIELab and CIEXYZ color spaces, which were designed to span the range colors discernable by the average human eye.

Conversion between these color spaces can be achieved via linear transformation. However, due to the nonlinearity of the respective color spaces, information may be lost during the conversion. Additionally, distortions may be introduced when mapping from a three-dimensional color space, such as RGB to a four-dimensional color space such as CMYK.

U.S. Pat. No. 8,634,640 filed Oct. 21, 2010, issued Jan. 22, 2014, discloses a method for color matching using digital cameras under varying lighting conditions. The proposed method describes acquiring an image of an object with a calibrated reference color chart, correcting the image for lighting discrepancies, such as applying a white balancing algorithm, and matching the sample of the corrected image to a color palette.

US patent publication US 2007/0242877 A1 filed Apr. 10, 2006, published Oct. 18, 2007, discloses a method for automatic color matching of a physical color swatch in a predefined color space. The proposed method describes acquiring an image of a sample with a calibrated reference color chart under controlled lighting conditions, and mapping the color of the sample in the acquired image to a color space.

SUMMARY OF THE PRESENT DISCLOSED TECHNIQUE

It is an object of the disclosed technique to provide a novel method and system for detecting color for a dyeing machine.

In accordance with the disclosed technique, there is thus provided a color detection system comprising a card having printed thereon a color chart comprising multiple colored areas, and at least one grayscale area; a camera configured to acquire an image comprising a pixel representation of a sample positioned adjacent to the card; at least one storage device configured to store reference data corresponding to the color chart, and reference coordinates for the at least one grayscale area; and at least one processor configured to: perform a grayscale correction to the pixel representation of the color chart of the card and the pixel representation of the sample using a grayscale correction transformation between the pixel representation of the at least one grayscale area and the reference coordinates for the at least one grayscale area, estimate a set of colorimetric coordinates for the sample by applying to the grayscale corrected pixel representation of the sample, a transformation between the grayscale corrected pixel representation of the color chart and the colorimetric reference data corresponding to the color chart, and convert the estimated set of colorimetric coordinates for the sample to a set of RGB coordinates for said sample.

In some embodiments, the reference coordinates for the at least one grayscale area comprise colorimetric reference data and corresponding reference RGB coordinates for the at least one grayscale area, and wherein the reference data corresponding to the color chart comprise colorimetric reference data and corresponding reference RGB coordinates for the color chart, wherein the grayscale correction is based on the reference RGB coordinates for the at least one grayscale area and the reference RGB coordinates for the color chart.

In some embodiments, the color chart spans a color gamut of a dyeing machine and wherein the at least one processor is further configured to provide the set of RGB coordinates for the sample to the dyeing machine, wherein the dyeing machine is configured to dye a substrate according to the set of RGB coordinates for the sample.

In some embodiments, the at least one grayscale area displays a gradient of different gray shades.

In some embodiments, the at least one grayscale area comprises multiple grayscale stripes framing the color chart.

In some embodiments, the card is provided with a cutout portion disposed flush against the color chart and the at least one grayscale area.

In some embodiments, the cutout portion abuts a first and a second of the at least one grayscale area, wherein the first grayscale area is a different shade of gray than the second grayscale area.

In some embodiments, the at least one processor is further configured to perform the grayscale correction to the pixel representation of the color chart by determining a shape defining each of the colored areas of the pixel representation of the color chart, and for each shape: determining average RGB coordinates for pixels positioned inside the shape, wherein RGB coordinates of pixels situated at a border of the shape and shapes of adjacent color areas are omitted from the average RGB coordinates, and assigning each pixel of the color area of the shape the average RGB coordinates.

In some embodiments, the at least one processor is configured to perform the grayscale correction by applying a first grayscale correction step to the pixel representation of the at least one grayscale area, and applying a second grayscale correction to the pixel representation of the color chart and the pixel representation of the sample.

In some embodiments, the at least one processor is further configured to perform the grayscale correction to the pixel representation of the color chart: for each colored area of the pixel representation of the color chart: select at least one of the at least one pixel representation of the grayscale area that is physically closest to the colored area, and perform a grayscale correction to RGB coordinates of the color area based on the selected at least one pixel representation of the grayscale area that is physically closest to the colored area, thereby independently performing a grayscale correction to each of the colored areas, wherein the at least one processor is further configured to perform the grayscale correction to the pixel representation of the sample by selecting at least one of the at least one pixel representation of the gray area that is physically closest to the pixel representation of the sample, and basing the grayscale correction to the pixel representation of the sample on the selected at least one pixel representation of the gray area that is physically closest to the pixel representation of the sample.

In accordance with the disclosed technique, there is thus provided a method for detecting a color of a sample, comprising: obtaining an image comprising a pixel representation of the sample positioned adjacent to a card having printed thereon a color chart comprising multiple colored areas, and at least one grayscale area; performing a grayscale correction to the pixel representation of the color chart and the pixel representation of the sample using a grayscale correction transformation between the pixel representation of the at least one grayscale area and reference coordinates for the at least one grayscale area; estimating a set of colorimetric coordinates for the sample by applying to the grayscale corrected pixel representation of the sample, a transformation between the grayscale corrected pixel representation of the color chart and colorimetric reference data corresponding to the color chart; and converting the estimated set of colorimetric coordinates for the sample to a set of RGB coordinates for said sample.

In some embodiments, the reference coordinates for the at least one grayscale area comprise colorimetric reference data and corresponding reference RGB coordinates for the at least one grayscale area, and wherein the reference data corresponding to the color chart comprise colorimetric reference data and corresponding reference RGB coordinates for the color chart, and wherein the grayscale correction transformation is based on the reference RGB coordinates for the at least one grayscale area.

In some embodiments, the method further comprises providing the set of RGB coordinates for the sample to a dyeing machine, wherein the color chart spans a color gamut of the dyeing machine, and wherein the dyeing machine is configured to dye a substrate according to the set of RGB coordinates for the sample.

In some embodiments, the method further comprises performing the grayscale correction by applying a first grayscale correction step to the pixel representation of the at least one grayscale area, and applying a second grayscale correction to the pixel representation of the color chart and the sample.

In some embodiments, the at least one grayscale area displays a gradient of different gray shades.

In some embodiments, the method further comprises performing the grayscale correction to the pixel representation of the color chart by determining a shape defining each of the colored areas in the pixel representation of the color chart, and for each shape: determining average RGB coordinates for the pixels positioned inside the shape, wherein RGB coordinates of the pixels situated at a border of the shape and shapes of adjacent color squares are omitted from the average RGB coordinates, and assigning each pixel of the colored area of the shape the average RGB coordinates.

In some embodiments, performing the grayscale correction to the pixel representation of the color chart comprises: for each colored area in the pixel representation of the color chart: selecting at least one of the pixel representation of the at least one grayscale area that is physically closest to the colored area, and performing a grayscale correction to RGB coordinates of the colored area based on the selected pixel representation of the at least one grayscale area that is physically closest to the colored area, thereby independently performing a grayscale correction to each of the colored areas, and wherein performing the grayscale correction to the pixel representation of the sample comprises selecting at least one of the pixel representation of the at least one gray area in the image that is physically closest to the pixel representation of the sample, basing the grayscale correction to the pixel representation of the sample on the selected pixel representation of the at least one gray area that is physically closest to the pixel representation of the sample.

In accordance with the disclosed technique, there is thus provided a card for detecting a color of a sample, comprising: a printed portion; and a cutout portion, wherein the printed portion comprises a color chart comprising multiple color squares, and at least two grayscale areas, wherein the at least two grayscale areas display a gradient of different gray shades, and wherein the at least two grayscale areas are oriented at different orientations.

In some embodiments, the at least one grayscale area comprises four grayscale stripes framing the color chart.

In some embodiments, the cutout portion abuts a first and a second of the at least one grayscale area, wherein the first grayscale area is a different shade of gray than the second grayscale area.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and method for detecting a color of a sample for a dyeing machine. A card is provided with a color chart printed thereon spanning a color gamut of the dyeing machine. The card may additionally have printed thereon one or more card identifiers, such as fiducials, barcodes and the like. The card is provided with a cutout portion that is designed to display a sample flush against the color chart. A mobile device acquires an image of the card overlaid on the sample, and applies one or more image processing techniques, such as illumination correction, filters and the like, to the acquired image. The mobile device analyzes the acquired image and detects the fiducials. The mobile device uses the fiducials to identify the pixel representation of the color chart, and rectifies the pixel representation of the color chart, accordingly. The mobile device transmits the processed image to a server.

The server analyzes the processed image and identifies the card identifier, i.e. the barcode. The server uses the barcode to query a database and retrieve reference data for the card that includes data relating to the physical characteristics of the card, such as the paper or plastic type, ink type or printing technology, and printing batch, as well as colorimetric data relating to the color chart, measured with a spectrophotometer and saved in device independent color coordinates, such as CIELab coordinates. The server applies the rectified color chart data together with the reference data to estimate the color of the sample in the CIELab color space, and converts the estimated color to a color that is within the gamut of the dyeing machine. The server stores the estimated RGB color in a database and provides the RGB color for display. The RGB color may be subsequently converted to a subtractive color space, such as CMY, CMYK or CMYK+, and provided to the dyeing machine, which dyes a dyeing substrate accordingly, such that the color of the dyed substrate matches the color of the original sample acquired in the image. Alternatively, the estimated color is provided in the CIELab color space to the dyeing machine, which converts the color to a subtractive color space for dyeing, accordingly. In this manner the color of the sample is detected.

Multiple colors may be detected thus, and stored in the database. The server may calculate a dyeing schedule using the multiple detected colors. A single dyeing substrate may be subsequently dyed to the multiple detected colors according to the dyeing schedule, where different sections of the dyeing substrate are each dyed to a different color. Alternatively, multiple dyeing substrates may each be dyed to a different one of the multiple colors. In one embodiment, the dyeing machine is a thread dyeing machine, and the dyeing substrate is a thread.

Figure 1A:
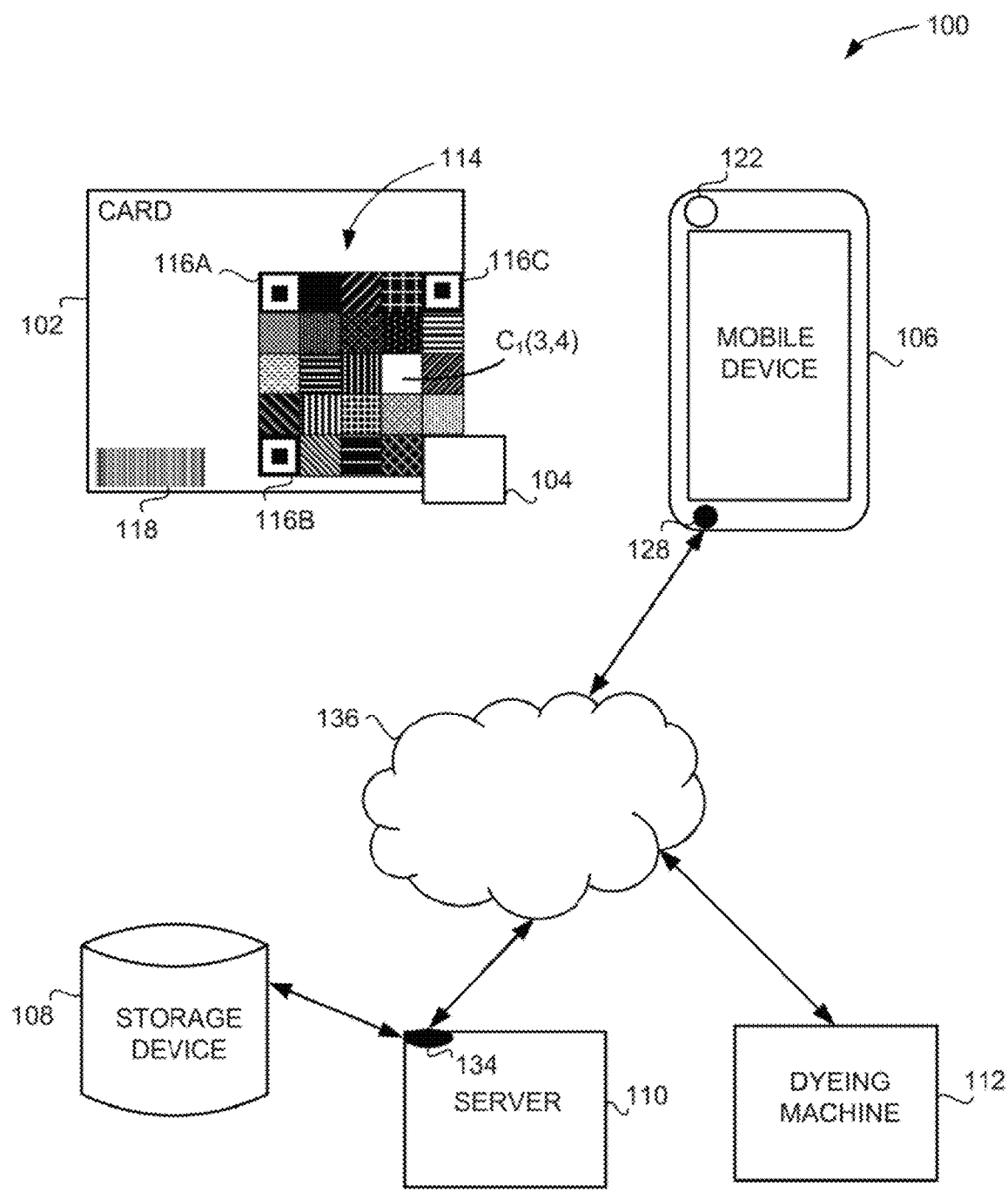
FIG. 1A is a schematic block diagram of a color detection system for a dyeing machine, in accordance with an embodiment of the disclosed techniques.

Reference is now made to FIGS. 1A-1D which are schematic illustrations of a color detection system 100 for a dyeing machine, in accordance with an embodiment of the disclosed techniques. FIG. 1A illustrates system 100 including a card 102, a sample 104, a mobile device 106, a storage device 108, a server 110, a network 136, and a dyeing machine 112. Card 102 has printed thereon at least a color chart 114, fiducials 116A, 116B, and 116C, and card identifier 118. Mobile device 106 is equipped at least with a camera (i.e. optical detector) 122, a processor 120 (not shown) and a transceiver 128. Server 110 is equipped at least with a processor 130 (not shown) and a transceiver 134.

Mobile device 106 is communicatively coupled to server 110 via respective transceivers 128 and 134, and network 136. Network 136 may be any combination of one or more communication networks, allowing for any combination of local and remote communication, such as a combination of one or more local and or private networks and the Internet. Server 110 is in communication with storage device 108, and with dyeing machine 112 via transceiver 134. Optionally, server 110 communicates with dyeing machine 112 via network 136. Mobile device 106 is positioned within visible range of card 102 and sample 104. Sample 104 may be any material, such as paper, fabric, synthetic resin, plastic, natural substances such as stone, wood, leaves or skin, to name a few. Card 102 is made of any suitable printable material such as paper, plastic, and the like. Card 102 is placed in physical proximity to sample 104 such that sample 104 is positioned flush against color chart 114 at a cutout portion 142 (not shown). In one embodiment, sample 104 is positioned flush against at least two different color squares of color chart 114. In another embodiment, cutout portion 142 cuts into three different squares of color chart 114, i.e. $C_1(4,4)$, $C_1(5,4)$, and $C_1(4,5)$, and sample 104 is positioned flush against at the three different color squares of color chart 114, such as squares $C_1(4,4)$, $C_1(5,4)$, and $C_1(4,5)$ indicated in FIG. 1B.

Figure 1B:
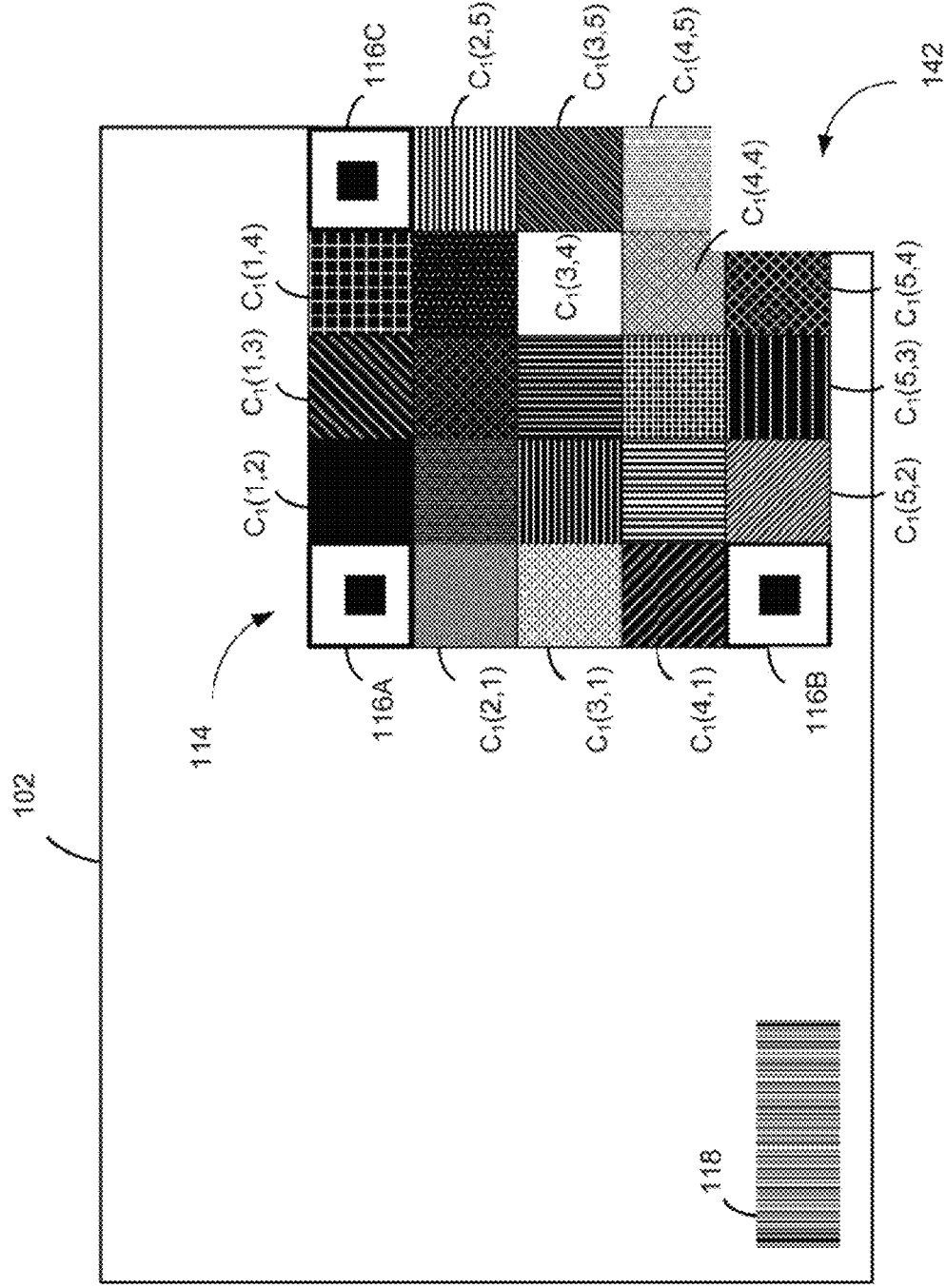
FIG. 1B is a schematic black and white rendition of a color detection card, corresponding to the color detection card of FIG. 1A, constructed and operative in accordance with an embodiment of the disclosed techniques.

Referring now to FIG. 1B which illustrates a close-up black and white representation of color printed card 102 of FIG. 1A, color chart 114 is implemented as a 5×5 grid comprised of 21 (=5×5-4) different colored squares, labeled $C_1(i,j)$, $i,j \in \{1 \ldots 5\}$, three fiducials of 116A, 116B, and 116C positioned at the top left, top right, and bottom left corners of the grid, respectively, and cutout portion 142 positioned at the bottom right corner of the grid, corresponding to the bottom right corner of card 102. Each of squares $C_1(i,j)$ is indicated in black-and-white for illustrative purposes only, and represents a different color, that together span a color gamut of dyeing machine 112 of FIG. 1A. Cutout portion 142 is positioned flush against at least two different colored squares, $C_1(5,4)$ and $C_1(4,5)$, of color chart 114 to allow for subsequent comparison and contrast against sample 104. According to one alternative, cutout portion 142 is positioned flush against at three different colored squares, $C_1(5,4)$, $C_1(4,4)$ and $C_1(4,5)$, of color chart 114. However, it is noted that cutout portion 142 may be disposed at other positions of card 102, such as at the center of card 102, abutting, as many as eight different color squares $C_1(i,j)$. It is further be noted that the positioning of fiducials 116A, 116B, and 116C is intended to be illustrative only, and other implementations for positioning one or more fiducials or identifiers on card 102, for identifying color chart 114 may be applied. Color chart 114 may be arranged as a grid of more or fewer colored squares. In some embodiments, the color chart is implemented as an n×n grid, however this is not intended to be limiting. According to another embodiment, described in greater detail below in conjunction with FIG. 2, the color chart may be implemented as a 9×9 grid. It may further be noted that color chart 114 may include different colored areas of any suitable shape, and there is no limitation that color chart 114 be square, and formed from multiple colored squares. For example, color chart 114 may be triangular, or hexagonal, or octagonal, and may be formed of colored areas that tile color chart 114, i.e. triangular, hexagonal, octagonal, respectively, or any combination thereof.

With reference to FIG. 10, which illustrates an exemplary implementation of mobile device 106 of FIG. 1A, mobile device 106 includes at least processor 120, camera 122, a user interface (UI) 124, a memory 126, and transceiver 128. Camera 122, UI 124, memory 126, and transceiver 128 are each electromagnetically coupled to processor 120.

Processor 120 may include any combination of a central processor (CPU), graphical processor (GPU), digital signal processor (DSP), accelerator processor (APU) and the like. Processor 120 is operative to store one or more program code instructions and data, such as raw images and processed images in memory 126. Transceiver 128 may include one or more of: a respective medium range RF transceiver (e.g., WIFI), a respective short range transceiver (e.g., Bluetooth), and a respective cellular communication transceiver (e.g., GSM, LTE, WIMAX). Transceiver 128 is operative to send and receive radio frequency (RF) signals relating to data and executable instructions. For example, transceiver 128 is operative to communicate with server 110 of FIG. 1A. UI 124 is a touch-based graphical user interface (GUI) operative to display images acquired via camera 122, and received touch-based input from a user.

Figure 1C:
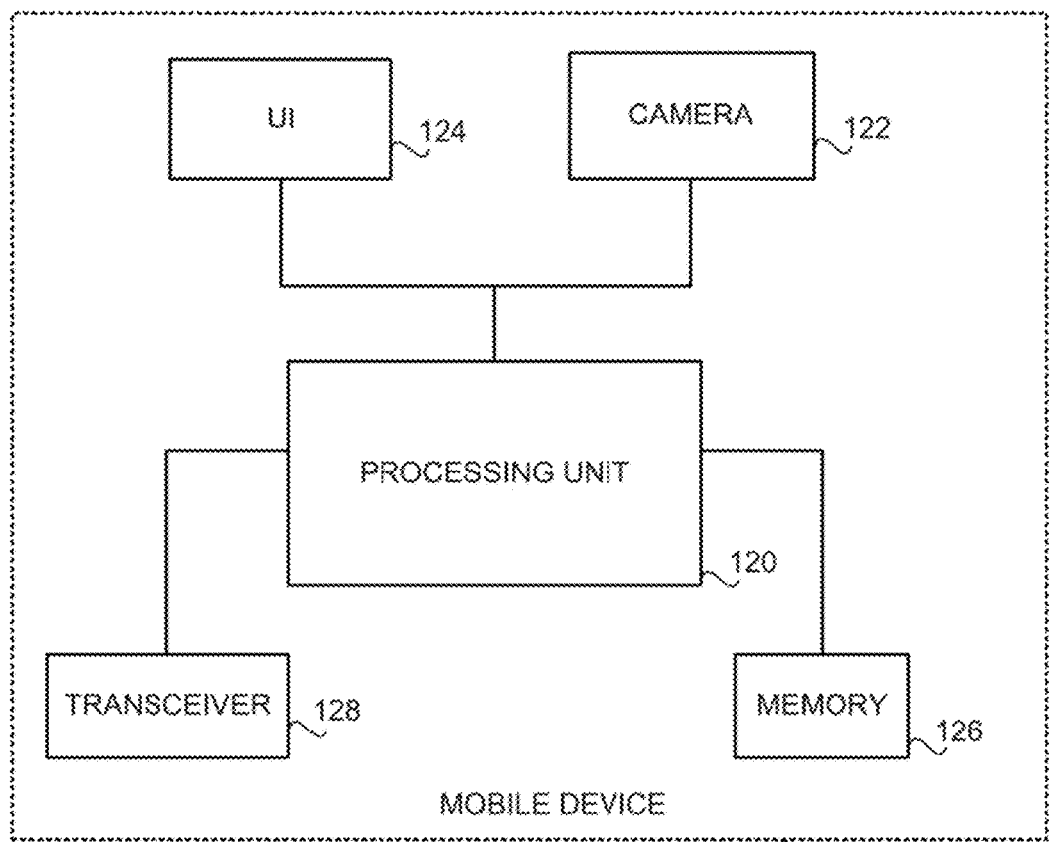
FIG. 1C is a schematic block diagram for a mobile device corresponding to the mobile device of FIG. 1A, constructed and operative in accordance with an embodiment of the disclosed techniques.
Figure 1D:
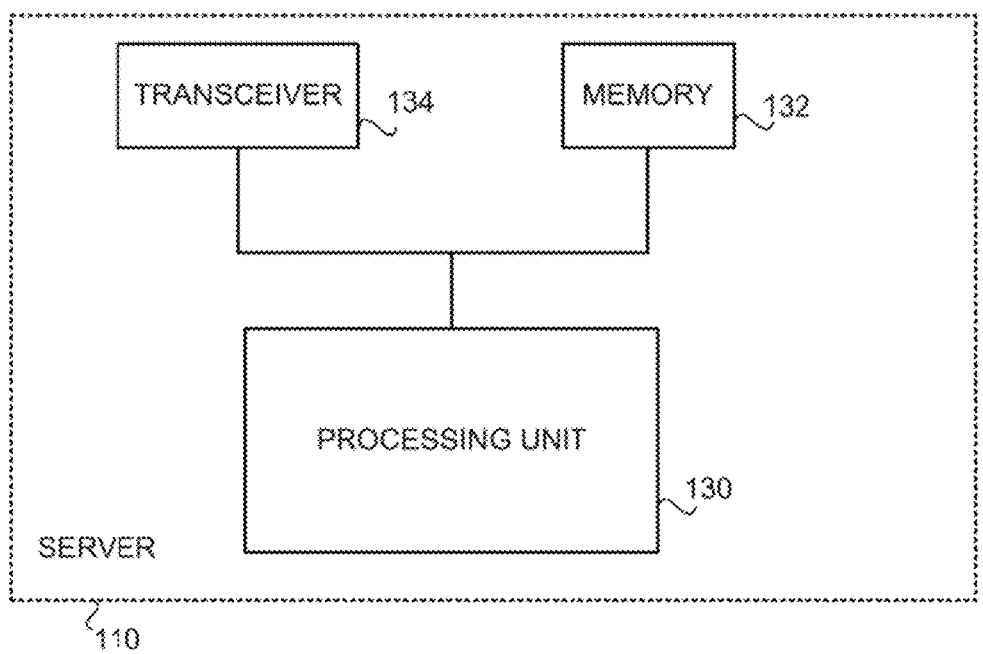
FIG. 1D is a schematic block diagram for a server corresponding to the mobile device of FIG. 1A, constructed and operative in accordance with an embodiment of the disclosed techniques.

Referring now made to FIG. 1D which illustrates an exemplary implementation of server 110 of FIG. 1A. Server 110 includes processor 130, a memory 132, and transceiver 134. Transceiver 134 and memory unit 132 are electromagnetically coupled to processor 130.

Processor 130 may include any combination of a central processor (CPU), graphical processor (GPU), digital signal processor (DSP), accelerator processor (APU) and the like. Processor 130 is operative to store one or more program code instructions and data, such as raw images and processed images in memory 132. Transceiver 134 may include one or more of: a respective medium range RF transceiver (e.g., WIFI), a respective short range transceiver (e.g., Bluetooth), and a respective cellular communication transceiver (e.g., GSM, LTE, WIMAX). Transceiver 134 is operative to send and receive radio frequency (RF) signals relating to data and executable instructions. For example, transceiver 134 is operative to communicate with mobile device 106, and storage device 108 of FIG. 1A.

Referring back to FIG. 1A, while still referring to FIGS. 1B-1D, camera 122 acquires an image of sample 104 positioned adjacent to card 102. Optionally, sample 104 is positioned flush against color chart 114 of card 102. The disclosed technique imposes no special illumination requirements for acquiring the image by camera 122 for the purpose of detecting the color of sample 104. Mobile device 106 stores the acquired image in memory 126, where the acquired image is defined as color pixel values in the camera color space, such as an RGB color space defined by coordinates $(R_{IMG}, G_{IMG}, B_{IMG})$. Mobile device 106 detects the pixel representation of color chart 114, $(R_{CC}, G_{CC}, B_{CC})$, and the pixel representation of sample 104, $(R_S, G_S, B_S)$, in the acquired image pixels $(R_{IMG}, G_{IMG}, B_{IMG})$. In one embodiment, mobile device 106 uses the detection of the pixel representation of fiducials 116A, 116B, and 116C to detect color chart 114 and sample 104. Mobile device 106 uses the detection of the pixel representation of color chart 114 to perform one or more of the following pre-processing procedures to the raw image data:

Mobile device 106 crops the pixel representation of color chart 114, $(R_{CC}, G_{CC}, B_{CC})$, and sample 104, $(R_S, G_S, B_S)$ from the acquired image pixels $(R_{IMG}, G_{IMG}, B_{IMG})$.

Mobile device 106 rectifies the cropped pixel representation of color chart 114 and sample 104, such as by applying an affine transformation to correct for distortion due to the angle of camera 122 with respect to card 102 and sample 104.

Mobile device 106 locates within the pixel representation of color chart 114, $(R_{CC}, G_{CC}, B_{CC})$, at least one white square, such as white square $C_1(3,4)$, indicated in FIGS. 1A-1B defined by pixels $(R_{WSQ}, G_{WSQ}, B_{WSQ})$. Mobile device 106 uses the at least one white square $C_1(3,4)$ to white balance the pixel representation color chart 114 and sample 104, to correct for distortions due to non-uniform, or non-standard illumination.

For example, to perform the white balancing procedure, mobile device 106 computes a correction factor $(R_{Corr}, G_{Corr}, B_{Corr})$ between the pixel representation $(R_{WSQ}, G_{WSQ}, B_{WSQ})$ of white square $C_1(3,4)$, and a reference white, stored in memory 126, i.e. pixel values (255, 255, 255), as follows:

$$(R_{Corr}, G_{Corr}, B_{Corr}) = (255/R_{WSQ}, 255/G_{WSQ}, 255/B_{WSQ})$$

Mobile device 106 applies the corrective factor to the pixel representation of color chart 114, $(R_{CC}, G_{CC}, B_{CC})$, and to the pixel representation of sample $(R_S, G_S, B_S)$:

$$(R_{CC}^{Corr}, G_{CC}^{Corr}, B_{CC}^{Corr}) = (R_{Corr} \cdot R_{CC}, G_{Corr} \cdot G_{CC}, B_{Corr} \cdot B_{CC})$$

$$(R_S^{Corr}, G_S^{Corr}, B_S^{Corr}) = (R_{Corr} \cdot R_S, G_{Corr} \cdot G_S, B_{Corr} \cdot B_S)$$

In one embodiment, mobile device 106 additionally corrects for a lack of color uniformity of squares $C_1(i,j)$, such as by computing for each color square $C_1(i,j)$, an average RGB pixel value for a neighborhood of pixels about a pixel positioned at the center of the respective square $C_1(i,j)$, and assigning the average RGB pixel value to all the pixels in the respective square $C_1(i,j)$. In a similar manner, mobile device 106 corrects for a lack of color uniformity of the pixel representation of sample 104. Mobile device 106 provides the processed image data to server 110 via respective transceivers 128 and 134.

Optionally, to correct for a lack of color uniformity the pixel representation of color chart 114, mobile device 106 determines a shape box defining each pixel representation of each colored area $C_i(i,j)$ of color chart 114, where the size of the shape is a function of the resolution of the acquired image. For example, if the colored areas of color chart 114 are square, then the shape may be a box surrounding each square. Similarly, of the colored areas of color chart 114 are triangular or hexagonal, then the shape may be a triangle or hexagon surrounding each colored triangle, or hexagon, respectively. For each color area $C_1(i,j)$, mobile device 106 determines the average RGB value for the pixels within the defined shape, while omitting pixels situated at the border between any two adjacent colored areas $C_1(i,j)$. Processor 120 assigns each respective pixel of each colored area $C_1(i,j)$ the average RGB value. Similarly, mobile device 106 determines the average pixel value for the pixel representation of sample 104, while omitting pixels situated at the border between sample 104 and color chart 114 from the average value. Mobile device 106 assigns the average value to the pixels of the pixel representation of sample 104. While computing the average RGB value of sample 104, mobile device 106 may assess the distortion due to shadows inherent in the pixel representation of sample 104. If the distortion due to shadows is within a predefined threshold, mobile device 106 displays the rectified, cropped pixel representation of color chart 114 at UI 124 of mobile device 106. Otherwise, if the distortion due to shadows crosses the predefined threshold, mobile device 106 may alert the user of mobile device 106 to acquire another image.

In another implementation, one or more of the aforementioned pre-processing procedures are performed by server 110. For example, on one such implementation, mobile device 106 transmits the raw image acquired by camera 122 to server 110 via respective transceivers 128 and 134, and server 110 applies the respective pre-processing procedures described hereinabove to the raw image.

Storage device 108 stores reference data corresponding to card 102 in association with card identifier 118. The reference data includes card characteristics for card 102 relating to factors that may influence the visual perception of the printed colors of color chart 114, such as data relating to the type of paper or plastic for card 102, the type of ink used to print card 102, the printing batch number for card 102, and the like. The reference data further includes device independent colorimetric data corresponding to a standardized visual perception of the printed colors of color chart 114, acquired in advance under controlled illumination using a spectrophotometer (not shown), and stored in a device independent color-space such as CIELab, CIEXYZ, and like, referred to hereinafter as "ground truth" (GT) data, i.e. $(L_{GT}, a_{GT}, b_{GT})$. In one embodiment, the ground truth data for color chart 114 of card 102 corresponds to the absolute colorimetric data for each color square of color chart 114 in device independent GT color space coordinates, as acquired by the spectrophotometer. Alternatively, storage device 108 stores relative colorimetric GT colorimetric coordinates for each colored square of color chart 114 for card 102, i.e. $(L_{GT}^{Rel}, a_{GT}^{Rel}, b_{GT}^{Rel})$ by applying a chromatic adaptation transformation to the absolute GT colorimetric data acquired above, such as described in CIE TC 1-52 (2004): *A Review of Chromatic Adaptation Transforms*, 160:2004. *CIE, ISBN* 978-3-901906-30-5. Christine Fernandez-Maloigne (2013). *Advanced color image processing and analysis (PDF)*. New York, N.Y.: *Springer*. p. 33. ISBN 9781441961891. For example, we might use the Bradford transform or CIE-CAM02 chromatic adaptation transform.

Server 110 analyzes the image received from mobile device 106 via respective transceivers 134 and 128, and detects the pixel representation of card identifier 118. Server 110 uses the pixel representation of card identifier 118 to determine a search query corresponding to the reference data for card 102, accordingly. Server 110 queries storage device 108 with the search query via transceiver 134, and obtains the reference data corresponding to card 102 from storage device 108, accordingly. Server 110 builds a color transformation to detect the color of sample 104, as follows:

Server 110 converts the processed pixel values for color chart 114 and sample 104 to the same color space as the reference data. For example, Server 110 converts the processed pixel values $(R_{CC}^{Corr}, G_{CC}^{Corr}, B_{CC}^{Corr})$, and $(R_S^{Corr}, G_S^{Corr}, B_S^{Corr})$ for color chart 114 and sample 104, respectively, to respective relative colorimetric GT color-space coordinates $(L_{CC}^{Corr}, a_{CC}^{Corr}, b_{CC}^{Corr})$, and $(L_S^{Corr}, a_S^{Corr}, b_S^{Corr})$.

Server 110 may apply a least squares method:

$$\min \| P_c(L_{CC}^{Corr}, a_{CC}^{Corr}, b_{CC}^{Corr}) - (L_{GT}^{Rel}, a_{GT}^{Rel}, b_{GT}^{Rel}) \|$$

to build a three-dimensional model between the corrected color-space coordinates of color chart 114, $(L_{CC}^{Corr}, a_{CC}^{Corr}, b_{CC}^{Corr})$, and the relative GT ground truth color-space coordinates for color chart 114 retrieved from storage device 108, $(L_{GT}^{Rel}, a_{GT}^{Rel}, b_{GT}^{Rel})$:

$$\widetilde{L_{GT}^{Rel}} = P_L(L_{CC}^{Corr}, a_{CC}^{Corr}, b_{CC}^{Corr})$$

$$\widetilde{a_{GT}^{Rel}} = P_a(L_{CC}^{Corr}, a_{CC}^{Corr}, b_{CC}^{Corr})$$

$$\widetilde{b_{GT}^{Rel}} = P_b(L_{CC}^{Corr}, a_{CC}^{Corr}, b_{CC}^{Corr})$$

where $(P_L, P_a, P_b)$ describe the transformation vector $\vec{P}_{Lab}$, and $\widetilde{Lab_{GT}^{Rel}}$ indicates the resulting approximated value Server 110 applies the transformation to the pixel values for sample 104 to estimate the color of sample 104 in the relative GT color space:

$$Lab_{Est} = \vec{P}_{Lab}(L_S^{Corr}, a_S^{Corr}, b_S^{Corr})$$

Server 110 converts the color coordinates for sample 104 from the relative GT color-space to a RGB color-space for display purposes, thereby detecting the RGB color of sample 104. The RGB value is determined such that it is within a color gamut of dyeing machine 112. Optionally, Server 110 performs the detecting in accordance with one or more characteristics of a substrate suitable for dyeing by dyeing machine 112. For example, when the dyeing substrate is a type of thread, server 110 detects the color in accordance with the thread type characteristics. Server 110 stores the detected RGB color for sample 104 at storage device 108, and provides the detected RGB color to mobile device 106 via respective transceivers 128 and 134, and network 136. Mobile device 106 displays the detected RGB color for sample 104 at user interface 124. Optionally, Server 110 converts the detected RGB color for sample 104 to a subtractive color space, such as CMY, CMYK, or CMYK+, or additional inks color spaces for dyeing machine 112. Dyeing machine 112 may subsequently dye a dyeing substrate matching sample 104, accordingly.

Figure 2A:
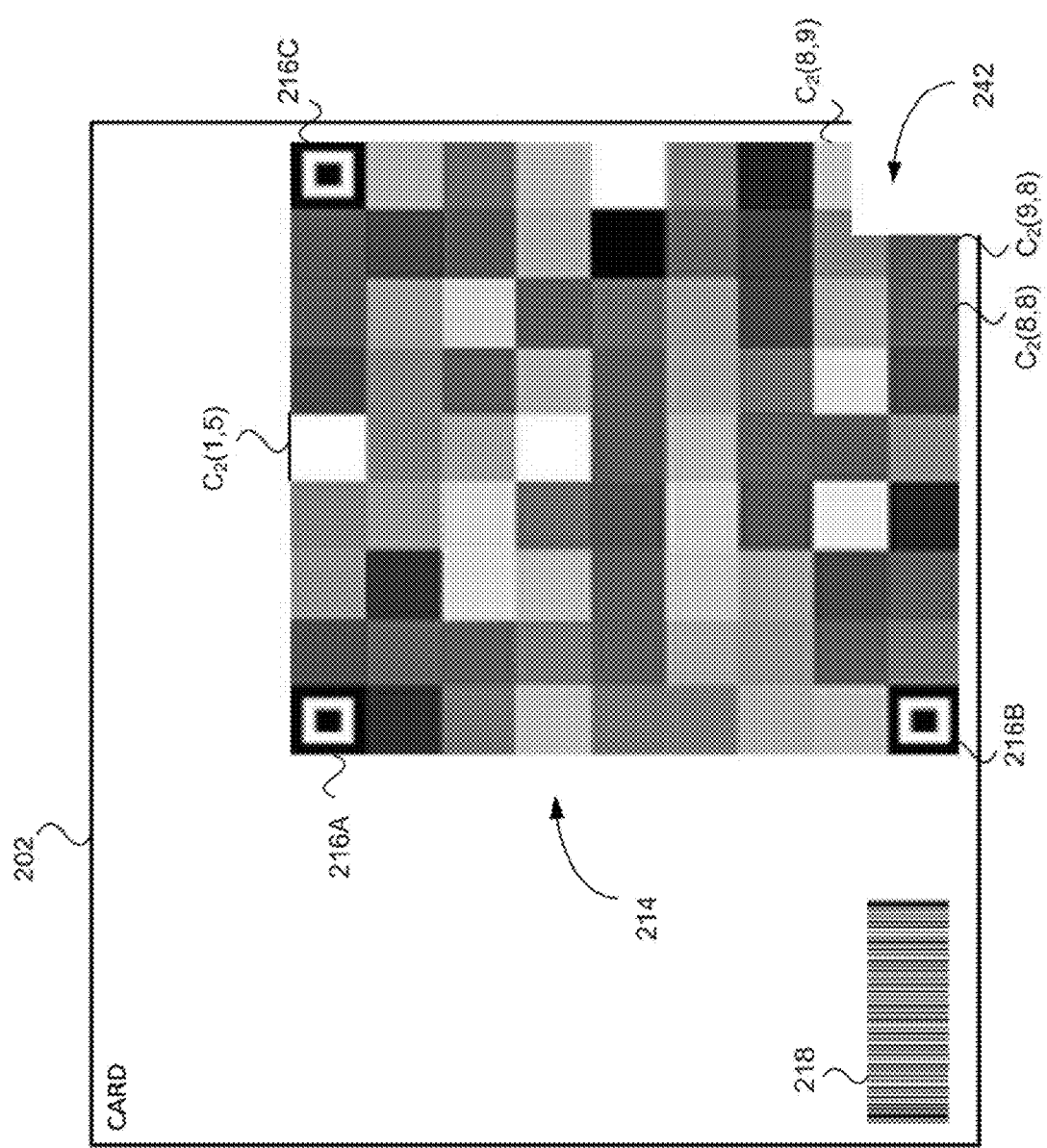
FIG. 2A illustrates a color rendition of a color detection card for detecting the color of a sample, constructed and operative in accordance with a further embodiment of the disclosed techniques.

Reference is now made to FIG. 2A which is a color illustration of a card 202 for detecting the color of a sample, in accordance with a further embodiment of the disclosed techniques. Card 202 may be used in conjunction with the system of FIGS. 1A, and 1C-1D, in place of card 102. Card 202 has printed thereon a color chart 214, fiducials 216A, 216B, and 216C, and card identifier 218, corresponding to color chart 114, fiducials 116A, 116B, and 116C, and card identifier 118 of FIGS. 1A-1B. At least one square of color chart 214 is a white square corresponding to white square $C_1(3,4)$ of FIGS. 1A-1B and having RGB values (255, 255, 255), such as square $C_2(1,5)$. White square $C_2(1,5)$ is provided to allow for the subsequent white balancing of an image of card 202 acquired by camera 122 of FIG. 1A. Card 202 is further provided with a cutout portion 242 positioned at the bottom right corner.

Color chart 214 is arranged as a 9×9 grid of squares, $C_2(i,j)$, $i, j \in \{1 \ldots 9\}$, having 77 (=9×9-4) different colored squares, of which at least one is white square $C_2(1,5)$. Fiducials 216A, 216B, and 216C, are similarly positioned at the top-left, top-right, and bottom-left corners of color chart 214. Cutout portion 242 is sized and positioned thus to border on three different colored squares of color chart: $C_2(8,8)$, $C_2(9,8)$ and $C_2(8,9)$ to allow for comparison and contrast with three different colors when a sample (not shown) is positioned at cutout portion 242, as described above with respect to FIGS. 1A-1D. The colors of squares $C_2(i, j)$ are selected to span the color gamut of dyeing machine 112 of FIG. 1A, such that the subsequently detected color of the sample will be within the dyeing capability of the machine. The colors of squares $C_2(i, j)$ may be selected to include a range of light and dark colors, varying shades of gray and color opposites. In particular, the colors of squares $C_2(8,8)$, $C_2(9,8)$ and $C_2(8,9)$ bordering on cutout portion 242 may be selected to provide contrast and comparison with respect to sample 104 of FIG. 1A when the sample 104 is positioned at cutout portion 242. The position of white square $C_2(1,5)$ at the top row and middle column may be selected according to one or more criterion, such as contrast with neighboring colored squares $C_2(i,j)$, distance from cutout portion 242, position with respect to fiducials 216A, 216B, 216C, and the like.

Figure 2B:
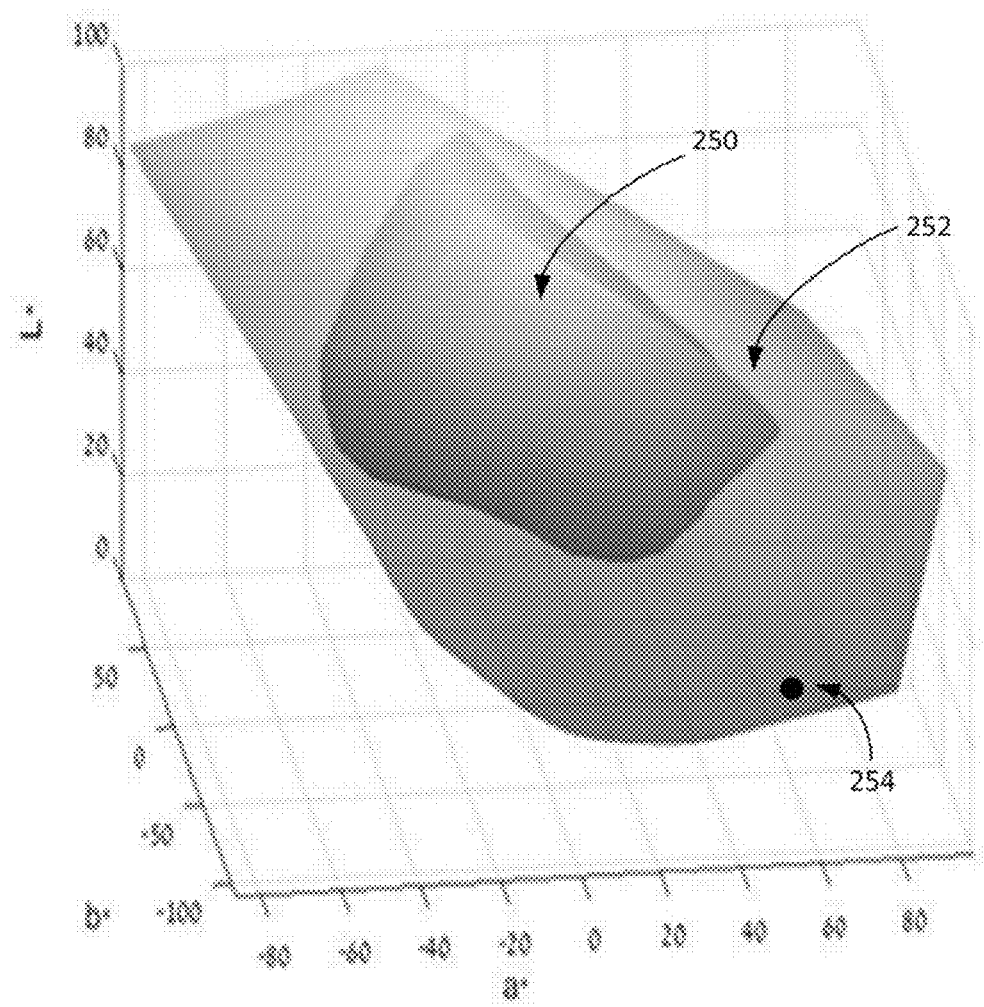
FIGS. 2B-2D are schematic illustrations of a method for determining when a detected color lies within the gamut of a dyeing machine, constructed and operative in accordance with another embodiment of the disclosed techniques.
Figure 2C:
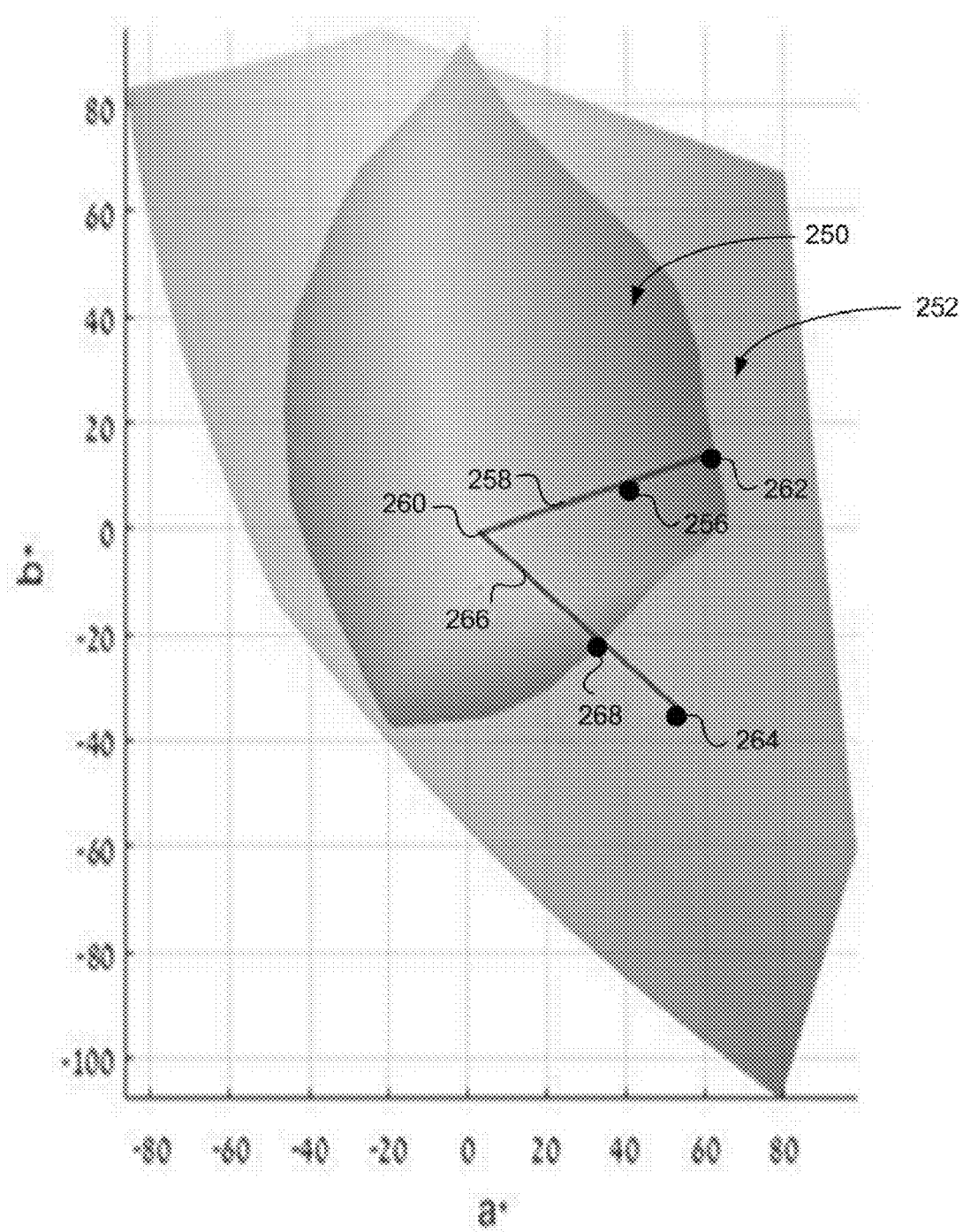
Figure 2D:
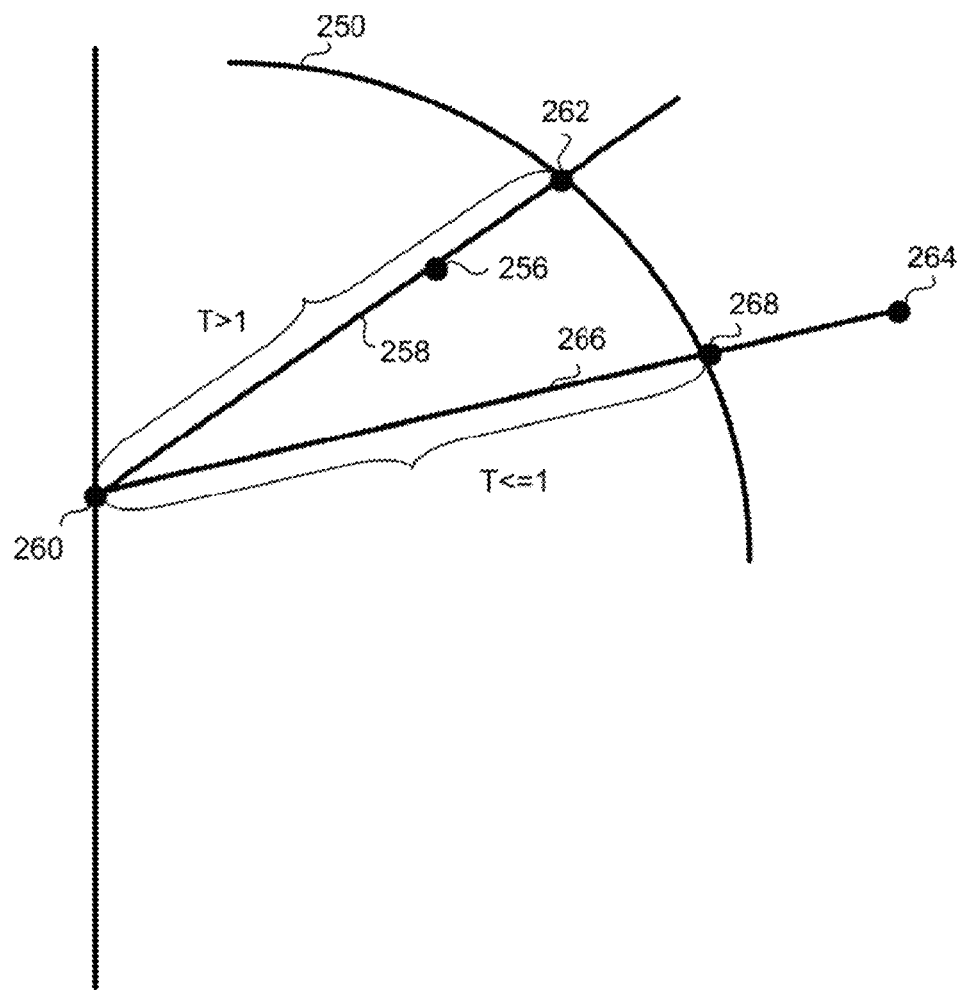

Reference to FIGS. 2B-2D, which when taken in conjunction with FIGS. 1A and 4A (described herein below), are schematic illustrations of a method for determining when a detected color lies within the gamut of a dyeing machine, constructed and operative in accordance with another embodiment of the disclosed techniques.

Referring to FIG. 2B, a schematic illustration comparing a small gamut and a large gamut is shown. Gamut 250 represents a relatively small gamut, such as the color gamut defining the dyeing limitations for dyeing machine 112. Gamut 252 represents a relatively large gamut, such as the color gamut defining the detection limitations for optical detector 122. Point 254 indicates the detected colorimetric coordinates of sample 104. Point 254 lies within the gamut of optical detector (i.e. camera) 122, but lies beyond the gamut of dyeing machine 112 and calibration card 102. When an image of a sample and a calibration card is captured, the respective gamuts of the optical detector and the calibration card and dyeing machine may be compared to each other. For example, on capturing an image of sample 104 and calibration card 102, mobile device 106 compares the gamut of optical detector 122 with the respective gamuts of calibration card 102 and dyeing machine 112.

Reference is now made to FIG. 2C, which is a schematic illustration showing multiple points lying within, outside, and on the surface of gamut shell 250 of FIG. 2B. A colorimetric point 256 is within gamut 250 of dyeing machine 112. A line 258 extends from a central point 260 of gamut 250, passing through inner colorimetric point 256 to a first edge point 262 located at the edge of gamut 250. A colorimetric point 264 is outside, or external to gamut 250 of dyeing machine 112. A line 266 extends from central point 260 of gamut 250, passing through a second edge point 268 located at the edge of gamut 250, and extending out to external colorimetric point 264.

On determining that the colorimetric coordinates of the color of sample 104 lie outside the gamut of dyeing machine 112, and thus beyond the dyeing capability of the dyeing machine 112, mobile device 106 indicates a warning to the user. Optionally, the warning further indicates the color space distance between the detected color of the sample and the color that would result from dyeing a substrate accordingly with dyeing machine 112. The color space distance may be determined with respect to each color channel of the dyeing machine, i.e. each ink color of the ink set configured with the dyeing machine, such as the ink colors cyan, magenta, and yellow, corresponding to the CMY ink set. In addition, a recommendation is optionally provided for the combination of inks from the ink set that would dye a substrate to a color that matches closest to the color of the detected sample.

A method for determining the distance between a detected colorimetric point, and the boundary 250 of a gamut (FIGS. 2A-2D) of dyeing machine 112 (FIG. 1A), is now described. Mobile device 106 determines the distance between point 264 and the outer border of gamut 250 as follows: let $(R,G,B)_S$ be the detected color of sample 104, as captured by optical detector 122 with calibration card 102 and subsequently detected by mobile device 106. Let $(R,G,B)_S^{Corr}$ be the color of sample 104 after correcting for illumination distortions. Mobile device 106 converts the color of sample 104 from RGB to CIELAB, i.e. convert $(R,G,B)_S$ to $(L_S^{Corr}, a_S^{Corr}, b_S^{Corr})$.

Let $GBD_{CMY}$, $GBD_{CMYK}$ and $GBD_{CMYK+}$, be the Gamut Boundary descriptors of the CMY, CMYK and CMYK+ ink sets, respectively, each of which may be represented by boundary 900. For each gamut, mobile device 106 calculates whether $(L_S^{Corr}, a_S^{Corr}, b_S^{Corr})$ is within boundary 250 of the gamut or outside boundary 250 of the gamut by calculating the line from the center ($K_{center}$), (260) of the gamut to the colorimetric point of sample 104 ($K_{sample}$), and determining the intersection between the line passing through $K_{center}$ and $K_{sample}$ as: $P=K_{center}+t*(K_{sample}-K_{center})$ and a point on the edge of gamut 250. If the intersection of the line and the edge point occurs at T>1, then the colorimetric point $K_{sample}$ is in-gamut, i.e. line 258 passes through in gamut point 256 before reaching edge point 262. Otherwise if the intersection of the line and the edge point occurs at T≤1, the colorimetric point $K_{sample}$ is out of gamut, i.e. line 266 passes through edge point 268 before reaching out of gamut colorimetric point 264. Techniques such as described in "Color Gamut Mapping", Jan Morovic John Wiley and Sons Ltd, United States, 2008) may be applied.

Mobile device 106 selects the ink set having the gamut that provides the smallest distance between the converted color ink matching solution of the colorimetric sample point to the ink proportions. For out of gamut points that are not included within any of the possible gamuts, mobile device 106 issues a gamut warning, where the severity of the warning may be based on the distance between the sampled point and its projection.

Figure 3:
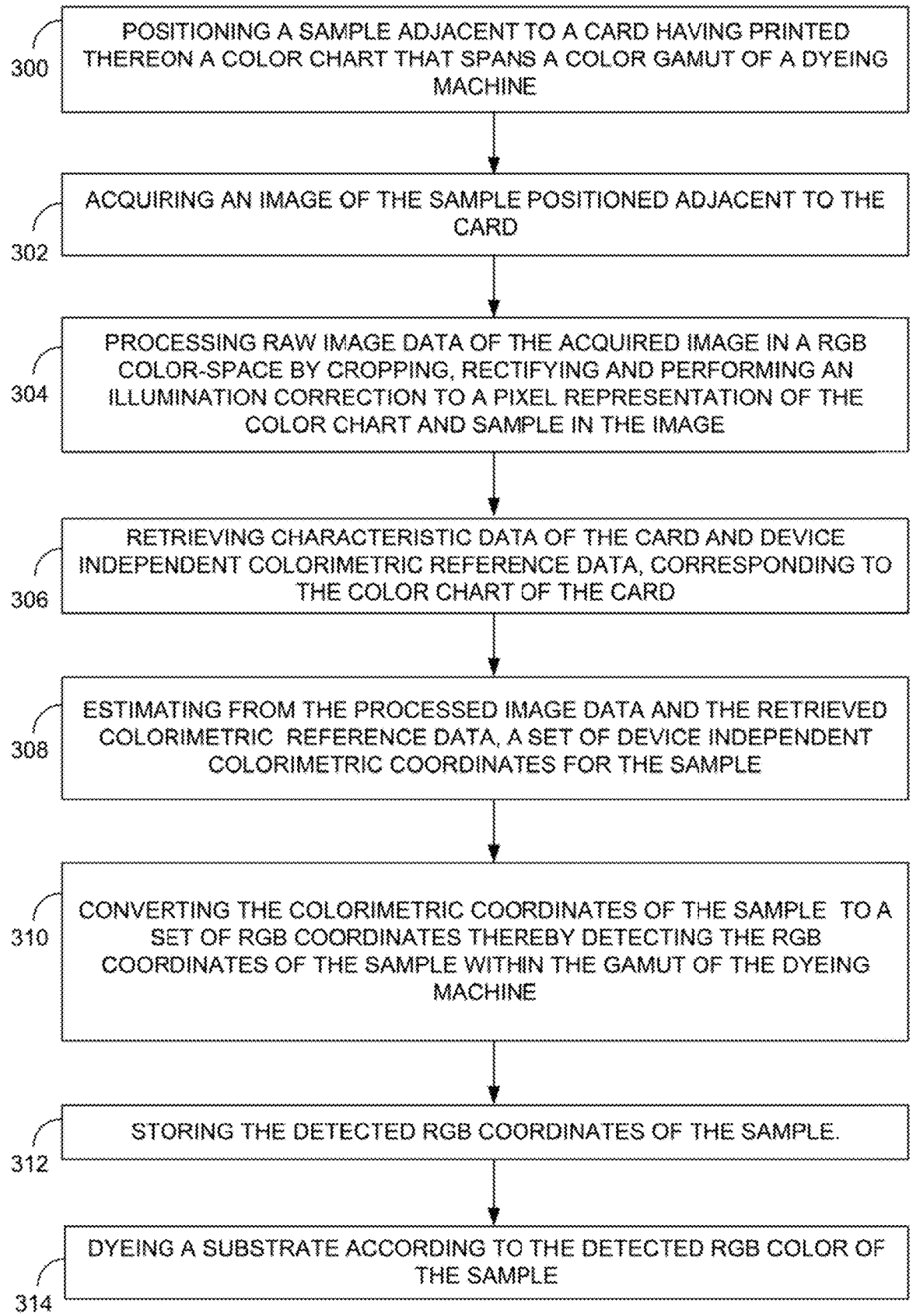
FIG. 3 is a schematic illustration of a method for detecting a color of a sample for a dyeing machine, in accordance with a further embodiment of the disclosed techniques.

A description of a method for detecting a color for a dyeing machine now follows. Reference is now made to FIG. 3, which is a schematic illustration of a method for detecting a color of a sample for a dyeing machine, in accordance with a further embodiment of the disclosed techniques.

In procedure 300, a sample is positioned adjacent to a card, the card having printed thereon a color chart spanning a color gamut of a dyeing machine. The sample may be positioned flush against the color chart. In one embodiment, the card is provided with a cutout portion disposed at a corner of the card, flush against three different colored squares of the color chart. Thus, when the sample is positioned at the cutout portion of the card, the sample is positioned flush against the three different color squares of the color chart. With reference to the system of FIGS. 1A-1D, card 102 is provided, having printed thereon a color chart 114 spanning a color gamut of dyeing machine 112, and a cutout portion 142. Sample 104 is positioned at cutout portion 142.

In procedure 302, an image of the sample positioned at the cutout portion of the card is acquired. With reference to the system of FIGS. 1A-1D, camera 122 acquires an image of sample 104 positioned thus, flush against color chart 114 of card 102.

In procedure 304, the raw data of the acquired image is processed in a RGB color-space, by cropping a representation of the color chart in the image, rectifying the cropped representation of the color chart in the image, such as by applying an affine transformation, and by performing an illumination correction to the cropped and rectified representation of the color chart, such as by applying a white balancing procedure. In one embodiment, a procedure may be applied to correct for a lack of color uniformity of the pixel representation of the color chart. The color uniformity procedure includes determining a shape defining each colored area of the pixel representation of the color chart (e.g. a box defining each color square), determining for each shape, an average RGB value for pixels inside the shape, where the average RGB value omits RGB values of pixels situated at the border between two adjacent colored areas of the pixel representation of the color chart, and assigning each respective pixel of each colored area the average RGB value. With reference to the system of FIGS. 1A-1D, mobile device 106 processes the acquired image data in the RGB color-space. Mobile device 106 provides the processed image data to server 110 via respective transceivers 128 and 134. In another implementation, mobile device 106 provides the acquired raw image data to server 110 via respective transceivers 128 and 134, and server 110 processes the acquired image in the RGB color-space by white balancing the acquired image, and by rectifying a pixel representation of color chart 114 of the acquired image.

In procedure 306, colorimetric (GT) reference data with respect to a device independent color space, and card characteristic data corresponding to the card is retrieved. The card characteristic data may include any of the paper or plastic type of the card, the printing technology of the color chart, and a printing batch number for the card. With reference to the system of FIGS. 1A-1D, storage device 108 stores the colorimetric reference data and card characteristic data corresponding to card 102 in a database. Server 110 uses card identifier 118 to query the database and retrieve from storage device 108 the colorimetric reference data and card characteristic data corresponding to card 102 via transceiver 134.

In procedure 308, a set of device independent colorimetric color coordinates for the sample is estimated from the processed pixel representation of the color chart and the sample, and the retrieved device independent color-space reference data and card characteristic data. With reference to the system of FIGS. 1A-1D, server 110 estimates a set of colorimetric coordinates for sample 104.

In procedure 310, the device independent colorimetric coordinates for the sample are converted to a RGB color space in accordance with one or more substrate characteristics and the card characteristics, thereby detecting the RGB coordinates for the sample, where the RGB coordinates are within the color gamut of the dyeing machine. With reference to the system of FIGS. 1A-1D, server 110 converts the colorimetric coordinates for sample 104 to a RGB color space.

In procedure 312, the detected RGB coordinates of the sample are stored, and the detected RGB color may be displayed. With reference to the system of FIGS. 1A-1D, server 110 stores the detected RGB color space coordinates of sample 104 at storage device 108, and provides the detected RGB color coordinates to mobile device 106 via respective transceivers 128 and 134, and network 136. Mobile device 106 displays the detected RGB color for sample 104 at user interface 124.

In procedure 314, the detected RGB color is converted to a subtractive color space for dyeing. A substrate is subsequently dyed with respect to the subtractive color space corresponding to the detected RGB color. With reference to the system of FIGS. 1A-1D, server 110 additionally converts the detected RGB color a subtractive color space for dyeing machine 112.

In procedure 314, a substrate is dyed according to the detected color. With reference to the system of FIGS. 1A-1D, dyeing machine 112 dyes at least one substrate according to the detected color of sample 104.

In another embodiment of the disclosed techniques, the color detection of a sample is further enhanced by detecting deviations between the sample and one or more gray features printed on a card. A card, substantially similar to card 102 of FIG. 1A may be provided, with the notable difference that in addition to a color chart, corresponding to color chart 114, the card has one or more grayscale stripes printed thereon. Since gray is made of equal proportions of R, G and B in the RGB color-space, it is easy to identify deviations of color from gray. The grayscale stripes may allow correcting for shadows, glares, discrepancies in the illumination, and other color distortions that may hamper accurate color detection.

Figure 4A:
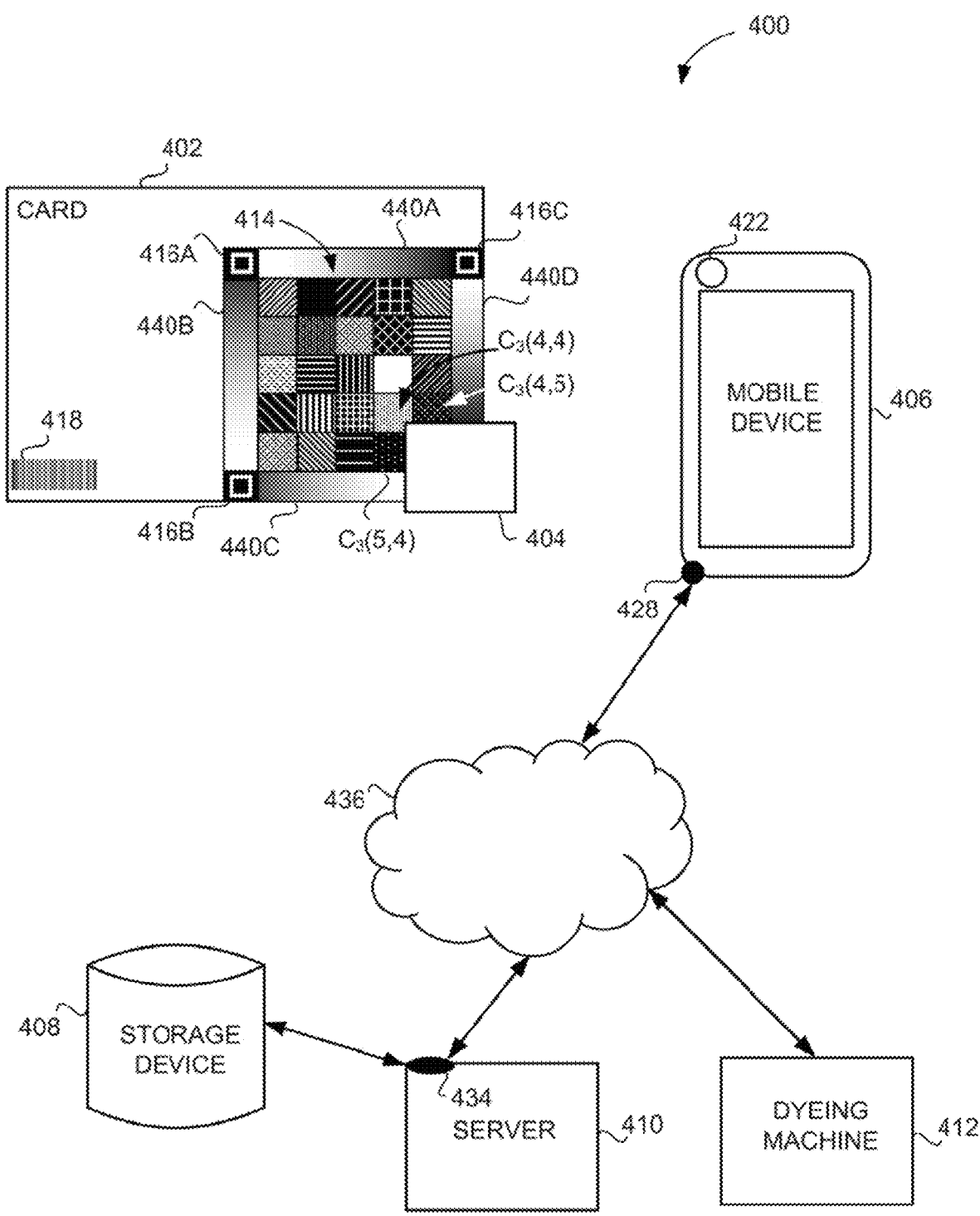
FIG. 4A is a schematic block diagram of a color detection system for a dyeing machine, in accordance with another embodiment of the disclosed techniques.
Figure 4B:
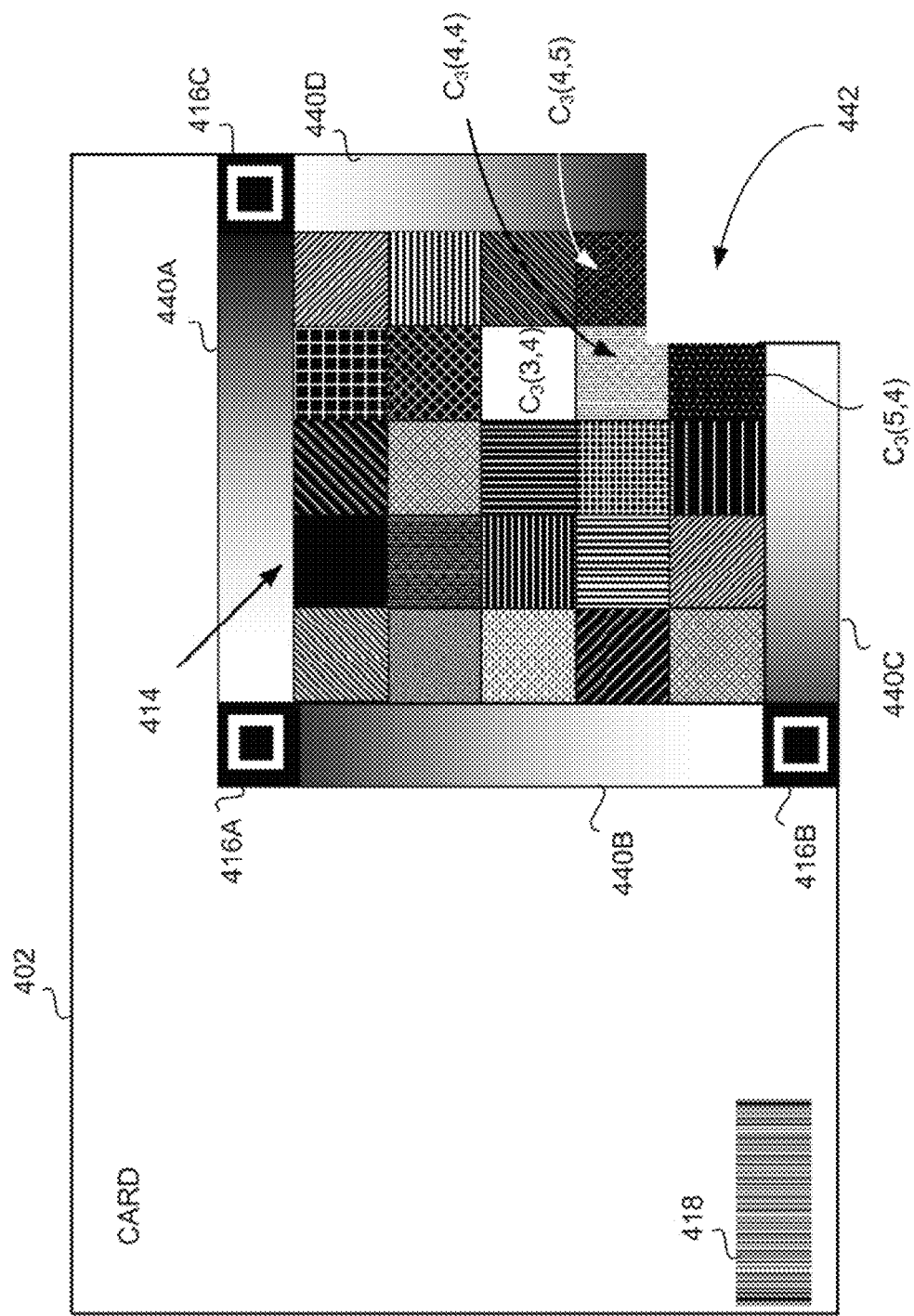
FIG. 4B is a schematic black and white rendition of a color detection card, corresponding to the color detection card of FIG. 4A, constructed and operative in accordance with a further embodiment of the disclosed techniques.

Reference is now made to FIGS. 4A-4B which are schematic illustrations of a color detection system 400 for a dyeing machine, in accordance with another embodiment of the disclosed techniques. FIG. 4A illustrates system 400 including a card 402, a sample 404, a mobile device 406, a storage device 408, a server 410, a network 436, and a dyeing machine 412. In one embodiment, dyeing machine 412 is a thread dyeing machine. Card 402 has printed thereon at least a color chart 414, fiducials 416A, 416B, and 416C, card identifier 418, and at least one grayscale stripe, indicated as multiple grayscale stripes 440A, 440B, 440C, and 440D. The operation and componentry of mobile device 406 and server 410 may be represented by respective mobile device 106 and server 110, described above in FIGS. 10-1D. Thus, mobile device 406, server 410, and storage device 408 are understood to be able to perform any of the procedures and calculations described above with respect to FIGS. 1A-1D. In particular, mobile device 406 and server 410 are provided with respective processors 420 and 430, memories 426 and 432, and transceiver 428, and 434 corresponding to respective processors 120 and 130, memories 126 and 132, and transceiver 128, and 134 of FIGS. 10-1D. Mobile device 406 is additionally provided with a user interface 424 and camera 422, corresponding to UI 124 and camera 122 of FIG. 10. Mobile device 406 and server 410 are operative to communicate with each other via respective transceivers 428 and 434 and network 436. Each of processors 420 and 430 of respective mobile device 406 and server 410 are operative to store one or more program code instructions and data, such as images and processed images, in memories 426 and 432.

Mobile device 406 is communicatively coupled to server 410 via network 436 that may include any combination of a public network such as the Internet, as well as private, local and remote networks. Server 410 is in communication with storage device 408, and with dyeing machine 412 via transceiver 434. Optionally, server 410 communicates with dyeing machine 412 via network 436. Mobile device 406 is positioned within visible range of card 402 and a sample 404. Sample 404 may be any material, such as paper, fabric, synthetic resin, plastic, natural substances such as stone, wood, leaves or skin, to name a few. Card 402 is made of any suitable material, such as paper, plastic, and the like. Card 402 is placed adjacent to sample 404. In one embodiment, sample 404 is positioned at a cutout portion 442 of card 402, flush against color chart 414 and grayscale stripes 440C and 440D. According to one alternative, sample 404 is positioned flush against at least two different color squares, $C_3(4,5)$, $C_3(5,4)$ of color chart 414 and grayscale stripes 440C and 440D. In another embodiment, sample 404 is positioned flush against three different squares, $C_3(4,5)$, $C_3(5,4)$, $C_3(4,4)$ of color chart 414 and grayscale stripes 440C and 440D. Positioned thus, sample 404 abuts two different shades of gray: a lighter shade of gray on grayscale stripe 440C, and a darker shade of gray on grayscale stripe 440D. However, it is noted that cutout portion 442 may be disposed at other positions of card 402, such as at the center of card 402, abutting, as many as eight different color squares $C_3(i,j)$.

FIG. 4B illustrates a close-up black and white representation of color printed card 402 of FIG. 4A, in accordance with a further embodiment of the disclosed technique. Card 402 has printed thereon multiple different colored squares arranged in a 5×5 grid, labeled $C_3(i,j)$, $i,j \in \{1 \ldots 5\}$. Each of squares $C_3(i,j)$, indicated in black-and-white for illustrative purposes only, represents a different color that together span a color gamut of dyeing machine 412. Other implementations for card 402 may have fewer or a greater number of colored squares. For example, the color chart 414 is described in greater detail below in conjunction with FIG. 5, has printed thereon a 9×9 grid and having 77 different colors. Additionally, card 402 has printed thereon a card identifier 418, such as a barcode. It may further be noted that color chart 414 may include different colored areas of any suitable shape, and there is no limitation that color chart 414 be square, and formed from multiple colored squares. For example, color chart 414 may be triangular, or hexagonal, or octagonal, and may be formed of colored areas that tile color chart 414, i.e. triangular, hexagonal, octagonal, respectively, or any combination thereof.

Four grayscale stripes 440A, 440B, 440C and 440D frame color chart 414, forming a grayscale box around color chart 414. One or more of grayscale stripes 440A, 440B, 440C and 440D span from white to black, such that subsequent illumination correction procedures using grayscale stripes 440A, 440B, 440C and 440D includes a white-balancing step. At the bottom right corner of color chart 414, is a cutout portion 442, positioned flush against at least two different colored squares, $C_3(5,4)$ and $C_3(4,5)$, of color chart 114, and additionally bordering grayscale stripes 440C and 440D. In one embodiment, cutout is positioned against three different colored squares, $C_3(4,4)$, $C_3(5,4)$ and $C_3(4,5)$, of color chart 414, and grayscale stripes 440C and 440D. At least one fiducial is provided on card 402, indicated as multiple fiducials 416A, 416B, and 416C, to allow identifying color chart 414 and grayscale stripes 440A, 440B, 440C and 440D. In the implementation of FIG. 4A, fiducials 416A, 416B, and 416C are positioned at the three respective corners of the box formed by the respective intersection of grayscale stripes 440A and 440B, grayscale stripes 440B and 440C, grayscale stripes 440A and 440D. Grayscale stripes 440A, 440B, 440C, and 440D may be arranged to contrast the lightest and darkest sections of each of respective stripes 440A, 440B, 440C, and 440D against each other. For example, the darkest section of grayscale stripe 440C is positioned adjacent to the lightest section of grayscale strip 440B, and the darkest section of grayscale stripe 440B is positioned adjacent to the lightest section of grayscale strip 440C. Thus, cutout portion 442 may abut each of a lighter section and a darker section of respective grayscale stripes 440C and 440D. For example, in the implementation of FIG. 4A, cutout portion 442 abuts a lighter section of grayscale stripe 440C and a darker section of grayscale stripe 440D. Optionally, color chart 414 may additionally include at least one white square, such as white square $C_3(3,4)$ to, allow for performing a white balancing procedure as described hereinabove. Alternatively, color chart 414 is void of a white square, and illumination correction is performed with respect to grayscale stripes 440A, 440B, 440C, and 440D, i.e. the illumination correction is performed exclusively with respect to grayscale stripes 440A, 440B, 440C, and 440D (e.g. "grayscale correction"). Optionally, one of grayscale stripes 440A, 440B, 440C, and 440D includes a white portion. It may be noted that the positioning of fiducials 416A, 416B, and 416C, and cutout portion 442 is intended to be illustrative only, and other implementations for positioning one or more fiducials or identifiers on card 402, for identifying color chart 414 may be applied. For example, cutout portion 442 may be positioned at the center of color chart 414, and may border as many as eight different squares $C_3(i,j)$. Additionally, it may be noted that color chart 414 may arranged as a grid of more or fewer colored squares. As noted above, color chart 414 may be any suitable shape, and the grayscale areas may have any suitable shape for bordering color chart 414. For example, if the color chart is round, grayscale area can form a ring surrounding the color chart. Similarly, if the color chart is triangular, hexagonal, octagonal and the like, the shape and orientation of the grayscale areas border the color chart. Alternatively, the grayscale area may be alongside the color chart, or may be printed on the card as a background.

Referring back to FIG. 4A, while still referring to FIG. 4B, camera 422 acquires an image of sample 404 positioned thus, flush against color chart 414 of card 402. The disclosed technique imposes no special illumination requirements for acquiring the image by camera 422 for the purpose of detecting the color of sample 404. Mobile device 406 stores the acquired image in memory 426, where the acquired image is defined as color pixel values $(R_{IMG}, G_{IMG}, B_{IMG})$ in an RGB color space. Mobile device 406 detects the pixel representation of color chart 414, $(R_{CC}, G_{CC}, B_{CC})$, grayscale stripes 440A, 440B, 440C, and 440D, $(R_{GS}, G_{GS}, B_{GS})$, and the pixel representation of sample 404, $(R_S, G_S, B_S)$, in the acquired image pixels $(R_{IMG}, G_{IMG}, B_{IMG})$, such as by detecting the pixel representation of fiducials 416A, 416B, and 416C. Mobile device 406 applies one or more preprocessing procedures to the above detected pixel representations of the respective features of card 402:

Mobile device 406 crops the pixel representation of color chart 414, ($R_{CC}$, $G_{CC}$, $B_{CC}$) grayscale stripes 440A, 440B, 440C, and 440D, ($R_{GS}$, $G_{GS}$, $B_{GS}$), and sample 404, ($R_S$, $G_S$, $B_S$) from the acquired image pixels ($R_{IMG}$, $G_{IMG}$, $B_{IMG}$). Mobile device 406 rectifies the cropped pixel representation of color chart 414, grayscale stripes 440A, 440B, 440C, and 440D and sample 404, such as such as by applying an affine transformation to correct for distortion due to the angle of camera 422 with respect to card 402 and sample 404.

In another embodiment, to correct the pixel representation of color chart 414, mobile device 406 determines a shape defining each pixel representation of each colored area $C_1(i,j)$ of color chart 414, where the size of the shape is a function of the resolution of the acquired image (e.g. a box defines each colored square $C_1(i,j)$ of color chart 414). For each color square $C_1(i,j)$, mobile device 406 determines the average RGB value for the pixels within the defined box, while omitting pixels situated at the border between any adjacent color squares $C_1(i,j)$. Mobile device 406 assigns each respective pixel of each color square $C_1(i,j)$ the average RGB value. Similarly, mobile device 406 determines the average pixel value for the pixel representation of sample 404, while omitting pixels situated at the border between sample 404 and color chart 414 from the average value. Mobile device 406 assigns the average value to the pixels of the pixel representation of sample 404. While computing the average RGB value of sample 404, mobile device 406 may assess the distortion due to shadows inherent in the pixel representation of sample 404. If the distortion due to shadows is within a predefined threshold, mobile device 406 displays the rectified, cropped pixel representation of color chart 414 at UI 420 of mobile device 406. Otherwise, if the distortion due to shadows crosses the predefined threshold, mobile device 106 may alert the user of mobile device 406 to acquire another image. The resulting pre-processed pixel representations of color chart 414, grayscale stripes 440A, 440B, 440C, and 440D, and sample 404 are denoted as ($R_{CC}^{preProc}$, $G_{CC}^{preProc}$, $B_{CC}^{preProc}$), ($R_{GS}^{preProc}$, $G_{GS}^{preProc}$, $B_{GS}^{preProc}$), ($R_S^{preProc}$, $G_S^{preProc}$, $B_S^{preProc}$). respectively. Mobile device 406 provides the pre-processed image data including at least the rectified and correct image pixels of color chart 414 ($R_{CC}^{preProc}$, $G_{CC}^{preProc}$, $B_{CC}^{preProc}$) sample 404 ($R_S^{preProc}$, $G_S^{preProc}$, $B_S^{preProc}$), grayscale stripes 440A, 440B, 440C, and 440D, ($R_{CC}^{preProc}$, $G_{CC}^{preProc}$, $B_{CC}^{preProc}$), ($R_{GS}^{preProc}$, $G_{GS}^{preProc}$, $B_{GS}^{preProc}$), ($R_S^{preProc}$, $G_S^{preProc}$, $B_S^{preProc}$), and card identifier 418 to server 410 via respective transceivers 428 and 434.

In another implementation, one or more of the aforementioned pre-processing procedures are performed by server 410. For example, on one such implementation, mobile device 406 transmits the raw image data acquired by camera 422 to server 410 via respective transceivers 428 and 434, and server 410 applies the respective pre-processing procedures described hereinabove to the raw image data.

Storage device 408 stores ground truth (GT) reference data corresponding to card 402 in association with card identifier 418. The reference data for card 402 relates to factors that may influence the visual perception of the printed colors of color chart 414 and grayscale stripes 440A, 440B, 440C, and 440D, such as data relating to the type of paper or plastic for card 402, the type of ink used to print card 402, the printing batch number for card 402, and the like. The GT reference data further includes colorimetric data acquired in advance under controlled illumination using a spectrophotometer (not shown), and stored in a device independent color-space such as CIELab, CIEXYZ, and the like, referred to hereinafter as colorimetric "ground truth" (GT) data. In one embodiment, the colorimetric ground truth data for color chart 414 and grayscale stripes 440A, 440B, 440C, and 440D of card 402 correspond to the absolute colorimetric color space data for each color square of color chart 114 in the GT color space coordinates, as acquired by the spectrophotometer, i.e. ($L_{GT-CC}$, $a_{GT-CC}$, $b_{GT-CC}$) for the GT data for color chart 414, and ($L_{GT-GS}$, $a_{GT-GS}$, $b_{GT-GS}$) for the GT data for grayscale stripes 440A, 440B, 440C, and 440D. Storage device 408 additionally includes GT RGB reference data for color chart 414, and grayscale stripes 440A, 440B, 440C, and 440D, ($R_{GT-GS}$, $G_{GT-GS}$, $B_{GT-GS}$), The GT RGB reference data for color chart 414, and grayscale stripes 440A, 440B, 440C, and 440D may be determined at the time of manufacturing card 402. In one embodiment, the RGB values of color chart 414, and grayscale stripes 440A, 440B, 440C, and 440D may be printed on card 402, and may be subsequently provided to server 410 in the acquired image.

In another embodiment, storage device 408 stores relative colorimetric GT coordinates for each colored square of color chart 414 and grayscale stripes 440A, 440B, 440C, and 440D for card 402, i.e. ($L_{GT-CC}^{Rel}$, $a_{GT-CC}^{Rel}$, $b_{GT-CC}^{Rel}$), and ($L_{GT-GS}^{Rel}$, $a_{GT-GS}^{Rel}$, $b_{GT-GS}^{Rel}$), respectively, such as may be determined by applying a chromatic adaptation transform such as Bradford transform or CIECAM02 to the absolute colorimetric GT data. The chromatic adaptation transform may be applied in accordance with the method described above with respect to FIGS. 1A-1D. Similarly, storage device 408 may store GT RGB coordinates for grayscale stripes 440A, 440B, 440C, and 440D for card 402, i.e. ($R_{GT-GS}$, $G_{GT-GS}$, $B_{GT-GS}$), respectively.

Server 410 analyzes the pre-processed image data received from mobile device 106 via respective transceivers 434 and 428, and identifies the pixel representation of card identifier 418. Server 410 uses the pixel representation of card identifier 418 to determine a search query corresponding to the reference data for card 402. In one embodiment, server 410 queries storage device 408 with the search query via transceiver 434, and retrieves the relative colorimetric GT reference data for color chart 414 ($L_{GT-CC}^{Rel}$, $a_{GT-CC}^{Rel}$, $b_{GT-CC}^{Rel}$), the relative colorimetric GT reference data for grayscale stripes 440A, 440B, 440C, and 440D ($L_{GT-CC}^{Rel}$, $a_{GT-CC}^{Rel}$, $b_{GT-CC}^{Rel}$), and the GT RGB components of color chart 414, and grayscale stripes 440A, 440B, 440C, and 440D i.e. ($R_{GT-GS}$, $G_{GT-GS}$, $B_{GT-GS}$).

In another embodiment, server 410 queries storage device 408 with the search query via transceiver 434, and retrieves the absolute GT colorimetric reference data for color chart 414 ($L_{GT-CC}$, $a_{GT-CC}$, $b_{GT-CC}$), the absolute GT colorimetric reference data for grayscale stripes 440A, 440B, 440C, and 440D ($L_{GT-GS}$, $a_{GT-GS}$, $b_{GT-GS}$), and the GT RGB components of grayscale stripes 440A, 440B, 440C, and 440D i.e. ($R_{GT-GS}$, $G_{GT-GS}$, $B_{GT-GS}$). Server 410 computes the respective relative GT colorimetric reference data from the retrieved absolute colorimetric reference data, such as by applying a Bradford transformation or CieCam02. Server 410 performs two illumination correction steps based on the grayscale stripes, herein referred to as "grayscale correction" steps. In a first grayscale correction step, server 410 uses the GT RGB components retrieved from storage device 408 to apply a first grayscale correction transformation to the pixel representation of grayscale stripes 440A, 440B, 440C, and 440D received from mobile device 406: server 410 averages the pixel values in the pixel representation of grayscale stripes 440A, 440B, 440C, and 440D received from mobile device 406, i.e. ($R_{GS}^{preProc}$, $G_{GS}^{preProc}$, $B_{GS}^{preProc}$) having a common value to ground truth pixel values ($R_{GT\text{-}GS}$, $G_{GT\text{-}GS}$, $B_{GT\text{-}GS}$) to obtain ($R_{GS}^{Corr}$, $G_{GS}^{Corr}$, $B_{GS}^{Corr}$).

In a second grayscale correction step, server 410 uses the results of the first correction step to correct the pixel representation of color chart 414 and sample 404: server 410 determines a grayscale transformation by fitting a curve ($f_r$, $f_g$, $f_b$) between the GT RGB reference data retrieved from storage device 408 for grayscale stripes 440A, 440B, 440C, and 440D, i.e. ($R_{GT\text{-}GS}$, $G_{GT\text{-}GS}$, $B_{GT\text{-}GS}$), and the processed pixel values for 440A, 440B, 440C, and 440D as determined from the acquired image, i.e. ($R_{GS}'$, $G_{GS}'$, $B_{GS}'$), such as by applying regression analysis, or spline interpolation:

$$R_{GS}'^{Corr} = F_r(R_{GT\text{-}GS})$$

$$G_{GS}'^{Corr} = F_g(R_{GT\text{-}GS})$$

$$B_{GS}'^{Corr} = F_b(R_{GT\text{-}GS})$$

Server 410 computes the second grayscale transformation as the inverse to the fitted curve ($f_r$, $f_g$, $f_b$), i.e. ($f_r^{-1}$, $f_g^{-1}$, $f_b^{-1}$). Server 410 applies the second grayscale transformation to the pre-processed pixel values for color chart 414, and sample 404 obtained from the acquired image:

$$(R_{CC}^{RelCorr}, G_{CC}^{RelCorr}, B_{CC}^{RelCorr}) = (f_r^{-1}(R_{CC}^{preProc}), f_g^{-1}(G_{CC}^{preProc}), f_b^{-1}(B_{CC}^{preProc}))$$

$$(R_S^{RelCorr}, G_S^{RelCorr}, B_S^{RelCorr}) = (f_r^{-1}(R_S^{preProc}), f_g^{-1}(G_S^{preProc}), f_b^{-1}(B_S^{preProc}))$$

Server 410 uses the obtained relative colorimetric GT reference data for color chart 414 ($L_{GT\text{-}CC}^{Rel}$, $a_{GT\text{-}CC}^{Rel}$, $b_{GT\text{-}CC}^{Rel}$) to build a color transformation as described above with respect to FIGS. 1A-1D, with the notable difference that the grayscale corrected pixel values are used to detect the color of sample 404, as follows:

Server 410 converts the grayscale corrected pixel values for color chart 414 and sample 404 to the same color space as the reference data. For example, server 410 converts the grayscale corrected pixel values ($R_{CC}^{RelCorr}$, $G_{CC}^{RelCorr}$, $B_{CC}^{RelCorr}$) and ($R_S^{RelCorr}$, $G_S^{RelCorr}$, $B_S^{RelCorr}$) for color chart 414 and sample 404, respectively, to respective relative colorimetric GT color-space coordinates ($L_{CC}^{RelCorr}$, $a_{CC}^{RelCorr}$, $b_{CC}^{RelCorr}$), and ($L_S^{RelCorr}$, $a_S^{RelCorr}$, $b_S^{RelCorr}$).

Server 410 may apply a least squares method between the grayscale corrected colorimetric space pixel values for color chart 414 ($L_{CC}^{RelCorr}$, $a_{CC}^{RelCorr}$, $b_{CC}^{RelCorr}$), and the relative colorimetric GT reference pixel values ($L_{GT\text{-}CC}^{Rel}$, $a_{GT\text{-}CC}^{Rel}$, $b_{GT\text{-}CC}^{Rel}$) for color chart 414, as follows:

$$\min \| P_c(L_{CC}^{RelCorr}, a_{CC}^{RelCorr}, b_{CC}^{RelCorr}) - (L_{GT\text{-}CC}^{Rel}, a_{GT\text{-}CC}^{Rel}, b_{GT\text{-}CC}^{Rel}) \|$$

to build a three-dimensional model between the grayscale corrected color-space coordinates of color chart 414, ($L_{CC}^{RelCorr}$, $a_{CC}^{RelCorr}$, $b_{CC}^{RelCorr}$), and the relative colorimetric GT ground truth color-space coordinates retrieved from storage device 408, ($L_{GT\text{-}CC}^{Rel}$, $a_{GT\text{-}CC}^{Rel}$, $b_{GT\text{-}CC}^{Rel}$):

$$\overrightarrow{L_{GT\text{-}CC}^{Rel}} = P_L(L_{CC}^{RelCorr}, a_{CC}^{RelCorr}, b_{CC}^{RelCorr})$$

$$\overrightarrow{a_{GT\text{-}CC}^{Rel}} = P_a(L_{CC}^{RelCorr}, a_{CC}^{RelCorr}, b_{CC}^{RelCorr})$$

$$\overrightarrow{b_{GT\text{-}CC}^{Rel}} = P_b(L_{CC}^{RelCorr}, a_{CC}^{RelCorr}, b_{CC}^{RelCorr})$$

where ($P_L$, $P_a$, $P_b$) describe the vector transformation $\overrightarrow{P_{Lab}}$.

Server 410 applies the transformation to the pixel values for sample 404 to estimate the grayscale corrected color of sample 404 in the device independent GT color space:

$$Lab_{Est} = \overrightarrow{P_{Lab}}(L_S^{RelCorr}, a_S^{RelCorr}, b_S^{RelCorr})$$

Server 410 converts the color coordinates for sample 404 from the GT color-space to a RGB color-space for display purposes, thereby detecting the RGB color for sample 404. The RGB value is determined such that it is within the color gamut of dyeing machine 412. Optionally, server 410 performs the mapping in accordance with one or more characteristics of a dyeing substrate suitable for dyeing by dyeing machine 412. For example, the dyeing substrate may be a thread, and dyeing machine 412 may be a thread dyeing machine.

Server 410 stores the detected RGB color of sample 404 at storage device 408, and provides the detected RGB color to mobile device 406 via respective transceivers 428 and 434, and network 436. Mobile device 406 displays the detected RGB color of sample 404 at user interface 424. Optionally, server 410 converts the detected RGB color to a subtractive color space, such as CMY, CMYK, or CMYK+ color spaces for dyeing machine 412. Additionally or alternatively, server 410 may apply a deep learning method with any of the methods described herein, to estimate the illumination when camera 422 acquires the image of card 402 with sample 404, such as by building a neural network using training data for card 402 acquired under varying illuminations, orientations, and noise conditions, using a range of different types of cameras and mobile devices.

To determine when a color lies within the gamut of a dyeing machine, the method described above with respect to FIGS. 2B-2D may be applied to system 400 of FIG. 4A, where sample 404, card 402, optical detector 422, dyeing machine 412 and mobile device 406 replace sample 104, card 102, optical detector 122, dyeing machine 112 and mobile device 106, respectively.

In yet another embodiment, the illumination correction is performed in RGB space with respect to one or more gray areas provided on card 402. The at least or more one gray areas span the gray axis of the gamut of card 402. The illumination correction for a captured image is based on the gray (e.g. achromatic) RGB values captured by mobile device 406, herein referred to as "grayscale correction". Since gray shades have equal proportions of R,G,B values in RGB space, deviations from gray are easy to detect. On determining the deviations between the detected color of gray stripes 440A, 440B, 440C, and 440D from true gray, the deviations are used to create a correction transformation matrix for the image. However, rather than performing an image wide correction with a single transformation matrix, each color square of color chart 414 is corrected individually, based on the nearest (e.g. physically closest) gray section of gray stripes 440A, 440B, 440C, and 440D.

Figure 4C:
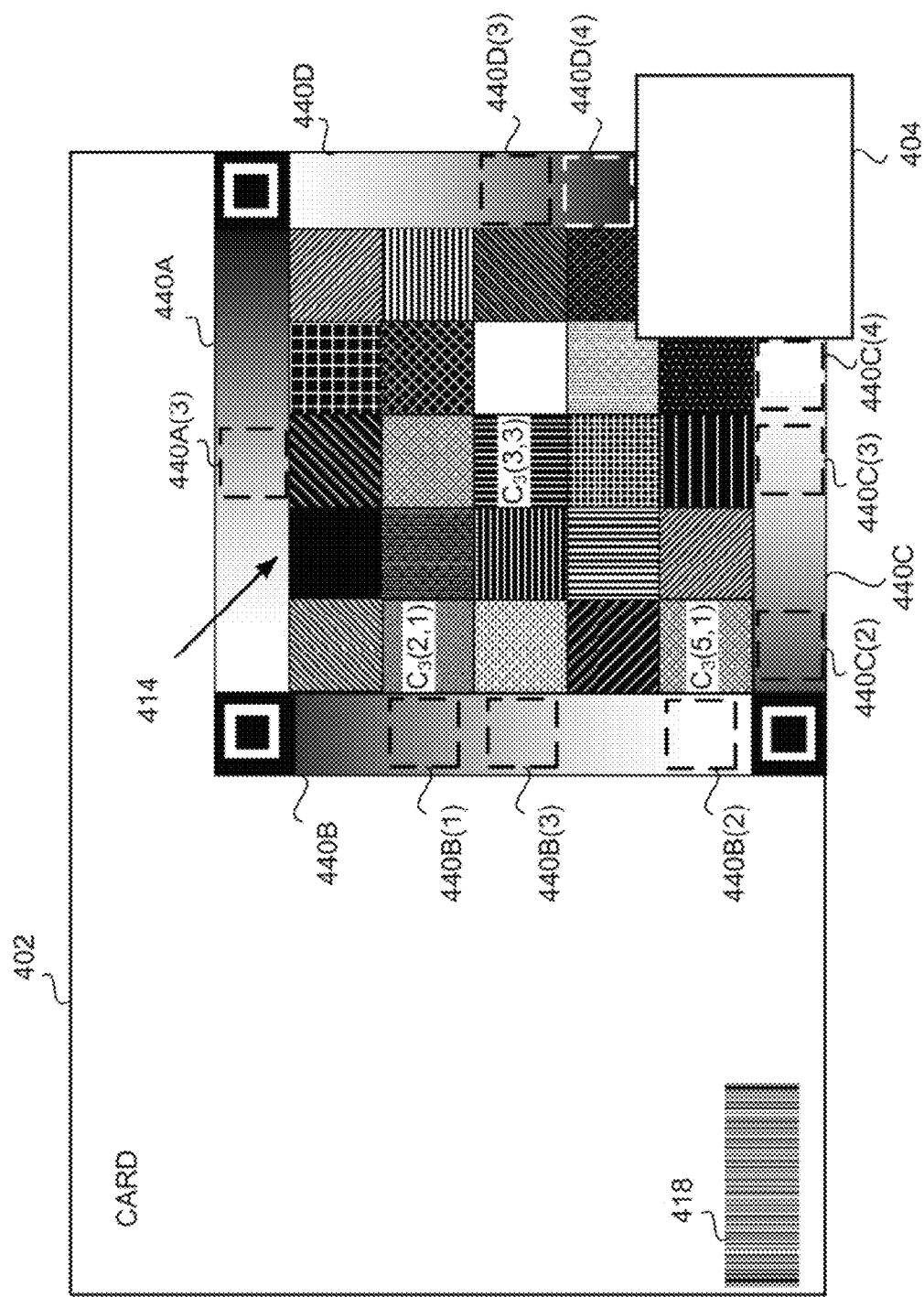
FIG. 4C is a schematic illustration the color chart of FIG. 4A, constructed and operative in accordance with another embodiment of the disclosed techniques.

Reference is now made to FIG. 4C which is a schematic illustration of color chart 414 of FIG. 4A, constructed and operative in accordance with another embodiment of the disclosed techniques. Each color square of color chart 414 has an individual correction transformation that is based on the gray sections of stripes 440A, 440B, 440C, and 440D positioned closest to the respective color square. A color square, positioned on the outer edge of color chart 414, is corrected relative to the gray section of the gray stripe that is adjacent to that color square. For example, square $C_3(2,1)$ is corrected based on the closest gray section, i.e. section 440B(1) of gray stripe 440B, adjacent to square $C_3(2,1)$. Color squares positioned on the outer corners of the color chart are corrected relative to the gray sections of the two gray stripes that abut the corner square. For example, square $C_3(5,1)$ is corrected based on section 440B(2) of adjacent gray stripe 440B and on section 440C(2) of adjacent gray stripe 440C. Color squares positioned at the middle of the color chart are corrected relative to the middle sections of all four gray stripes. For example, middle square $C_3(3,3)$ is corrected based the on middle section 440A(3) of gray stripe 440A, middle section 440B(3) of gray stripe 440B, middle section 440C(3) of gray stripe 440C, and middle section 440D(3) of gray stripe 440D. For each of the color squares of color chart 414, the transformation is determined by performing the following steps:

1. For each color square $C(i,j)$ (i.e. row i column j) in the image of color chart 414, determine the average color value $(R,G,B)_{cam}(i,j)$ over a neighborhood centered at the center of color square(i, j).
2. Form a matrix A of size N×M corresponding to the number of color squares $C(i,j)$ included in color chart 414, where entry $A(i,j)$ of the matrix corresponds to color square $C(i,j)$ of color chart 414.
3. Assign the average color value $(R,G,B)_{cam}(i,j)$ for color square $C(i,j)$ to corresponding matrix entry $A(i,j)$.
4. Identify multiple gray sections, $(R, G, B)_{cam}^{Gray}$ along stripes 440A, 440B, 440C, and 440D.
5. For each color square $C(i,j)$, calculate the physical distance to the gray sections $(R, G, B)_{cam}^{Gray}$.
6. For each entry of matrix $A(i, j)$, and for sample 404, select the K physically closest gray sections along stripes 440A, 440B, 440C, and 440D, $(R,G,B)_{Cam,k}^{Gray}$ k=1, . . . , K.
7. For each of color squares(i, j), and for sample 404 determine the deviation between the physically closest gray sections $(R, G, B)_{cam,k}^{Gray}$ and ground truth gray values corresponding to gray sections $(R, G, B)_{cam,k}^{Gray}$, where the ground truth gray values have equal proportions of R, G, B values in RGB space.
8. Fit a grayscale correcting curve f between $(R, G, B)_{cam,k}^{Gray}$ and the corresponding ground truth gray value, where (R',G',B') are the grayscale corrected values for the detected gray sections $(R, G, B)_{cam,k}^{Gray}$:

$R'=f_r(R)$ $G'=f_g(G)$ $B'=f_b(B))$

The grayscale fitting can be performed using any suitable technique, such as via regression analysis or spline interpolation.
9. Apply the grayscale correction transformation $f^1$ to matrix A and sample 404, thereby correcting the average color value $(R, G, B)_{cam}(i, j)$ for each color square (i,j), and sample 404

$(R,G,B)_{corr}=(f_r^{-1}(R_{cam}), f_g^{-1}(G_{cam}), f_b^{-1}(B_{cam}))$

Similarly, sample 404 is corrected based on the physically nearest sections of gray strips 440C and 440D, e.g. section 440C(4) of gray stripe 440C, and section 440D(4) of gray stripe 440D. Once each color square (i,j) of color chart 414 has been separately grayscale corrected, and sample 404 has been grayscale corrected, the grayscale corrected color chart 414 is used to match the grayscale corrected color of sample 404. Mobile device 406 and/or server 410 retrieve colorimetric GT reference data for color chart 414 ($L_{GT-CC}^{Rel}$, $a_{GT-CC}^{Rel}$, $b_{GT-CC}^{Rel}$), as described above, to build a color transformation between the grayscale corrected color chart 414 and the colorimetric GT reference data for color chart 414. The color transformation is applied to the grayscale corrected sample 404 to detect the color of sample 404, using the techniques described above. The matched color is saved at any of mobile device 406 and/or storage device 408. Subsequently, dyeing machine 412 may dye a substrate (not shown) according to the matched color.

It may be noted that positioning gray stripes 440A, 440B, 440C, and 440D around the perimeter of color chart 414 is but one implementation, and any suitable positioning for gray areas on card 402 may be used in the method above. For example, the one or more gray areas for determining the illumination deviation may be implemented as gray squares within color chart 414, or as one or more background colors of card 402, and the like.

Figure 5:
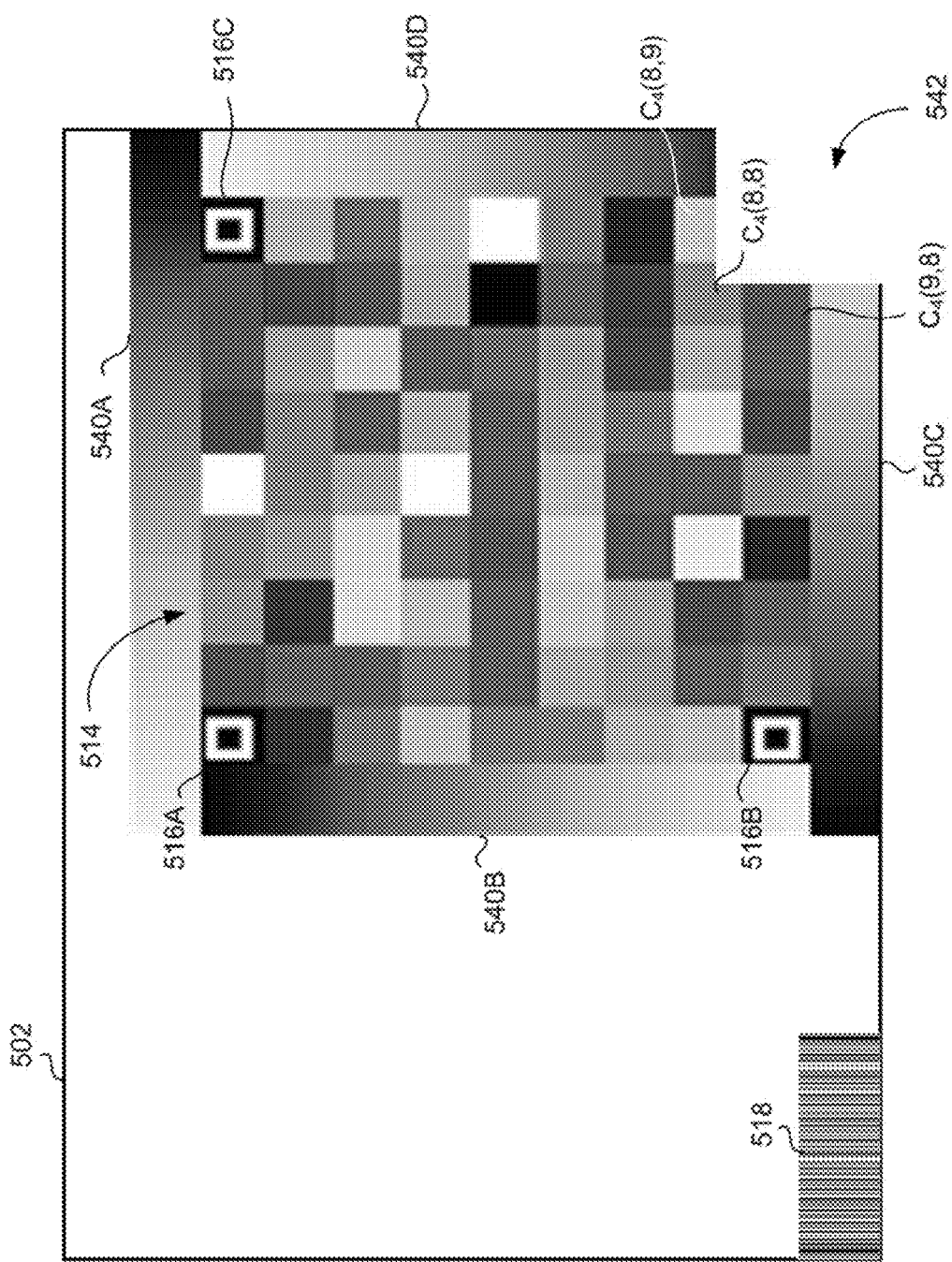
FIG. 5 is a color rendition of a color detection card for detecting the color of a sample, in accordance with a further embodiment of the disclosed techniques.

Reference is now made to FIG. 5 which is a color illustration of a card 502 for detecting the color of a sample, in accordance with a further embodiment of the disclosed techniques. Card 502 may be used in conjunction with the system of FIGS. 4A, and 1C-1D, in place of card 402. Card 502 has printed thereon a color chart 514, grayscale stripes 540A, 540B, 540C, and 540D, fiducials 516A, 516B, and 516C, and card identifier 518, corresponding to color chart 414, grayscale stripes 440A, 440B, 440C, and 440D, fiducials 416A, 416B, and 416C, and card identifier 418 of FIGS. 4A-4B. Optionally, at least one square of color chart 514 is a white square corresponding having RGB values (255, 255, 255) provided for subsequent white balancing of an image of card 502 acquired by camera 422 of FIG. 4A. Card 502 is further provided with a cutout portion 542 positioned at the bottom right corner.

Color chart 514 is arranged as a 9×9 grid of 80 different colored squares $C_4(i,j)$, $i,j \in \{1 \ldots 9\}$. Four grayscale stripes 540A, 540B, 540C and 540D frame color chart 514, forming a grayscale box around color chart 514. At the bottom right corner of color chart 514, is a cutout portion 542, positioned flush against at least two different colored squares of color chart 114, and additionally bordering grayscale stripes 540C and 540D. In one embodiment, cutout is positioned against three different colored squares of color chart 514, and grayscale stripes 540C and 540D. At least one fiducial is provided on card 402, indicated as multiple fiducials 516A, 516B, and 516C, to allow identifying color chart 514 and grayscale stripes 540A, 540B, 540C and 540D. In the implementation of FIG. 5, fiducials 516A, 516B, and 516C are positioned at the three respective corners of the box formed by the respective intersection of grayscale stripes 540A and 540B, grayscale stripes 540B and 540C, and grayscale stripes 540A and 540D. Grayscale stripes 540A, 540B, 540C, and 540D may be arranged to contrast the lightest and darkest sections of each of respective stripes 540A, 540B, 540C, and 540D against each other. For example, the darkest section of grayscale stripe 540C is positioned adjacent to the lightest section of grayscale strip 540B, and the darkest section of grayscale stripe 540B is positioned adjacent to the lightest section of grayscale strip 540C. Thus, cutout portion 542 may abut each of a lighter section and a darker section of respective grayscale stripes 540C and 540D. For example, in the implementation of FIG. 5, cutout portion 542 abuts a lighter section of grayscale stripe 540C and a darker section of grayscale stripe 540D. It may be noted that the positioning of fiducials 516A, 516B, and 516C, and cutout portion 542 is intended to be illustrative only, and other implementations for positioning one or more fiducials or identifiers on card 502, for identifying color chart 514 may be applied. Additionally, it may be noted that color chart 514 may arranged as a grid of more or fewer colored squares.

The colors of squares of chart 514 are selected to span the color gamut of dyeing machine 412 of FIG. 4A, such that the subsequently detected color of the sample will be within the dyeing capability of the machine. The colors may be selected to include a range of light and dark colors, varying shades of gray and color opposites. In particular, the colors of the squares $C_4(8,8)$, $C_4(9,8)$ and $C_4(8,9)$ bordering on cutout portion 542 may be selected to provide contrast and comparison with respect to sample 404 of FIG. 4A when the sample 404 is positioned at cutout portion 542. The position of white square at the top row and middle column may be selected according to one or more criterion, such as contrast with neighboring colored squares, distance from cutout portion 542, position with respect to fiducials 516A, 516B, 516C, and the like.

Figure 6A:
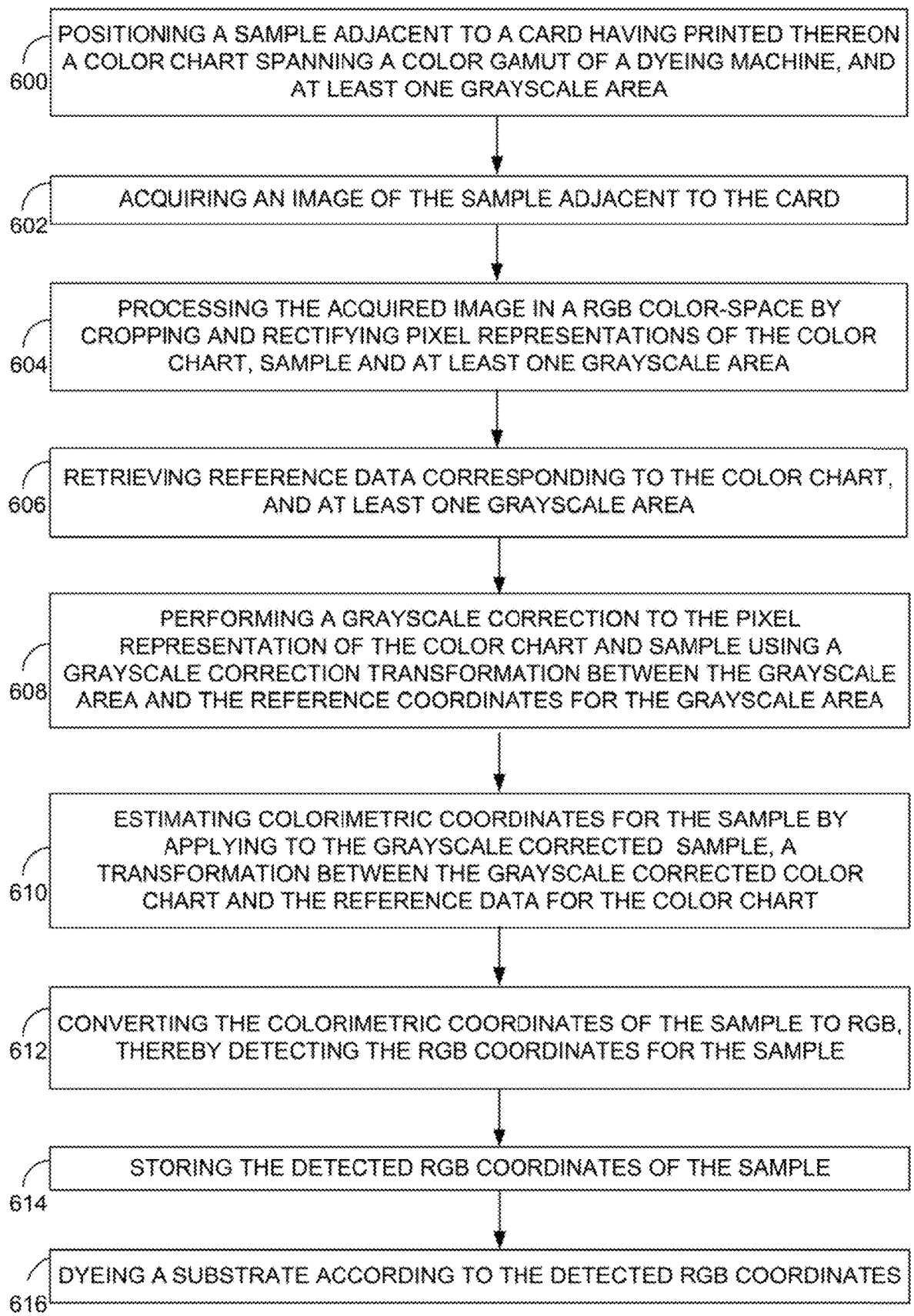
FIG. 6A is a schematic illustration of another method for detecting a color of a sample for a dyeing machine, in accordance with another embodiment of the disclosed techniques.

A description of another method for detecting a color for a dyeing machine now follows. Reference is now made to FIG. 6A, which is a schematic illustration of a method for detecting a color of a sample for a dyeing machine operative in accordance with another embodiment of the disclosed technique.

In procedure 600, a sample is positioned adjacent to a card having printed thereon a color chart spanning a color gamut of a dyeing machine and at least one grayscale area. In one embodiment, the at least one grayscale area is positioned at an edge of the card. The sample may be positioned at a cutout portion of the card disposed flush against the color chart and the at least one grayscale area. The at least one grayscale area may comprise four grayscale stripes framing the color chart. In one embodiment, the cutout portion abuts three different squares of the color chart, and two different grayscale stripes. With reference to the system of FIGS. 4A-4B, card 402 is provided, having printed thereon a color chart 414 and grayscale stripes 440A, 440B, 440C, and 440D, and provided with cutout portion 542. A sample 404 is positioned at cutout portion 542.

In procedure 602, an image comprising a pixel representation of the sample positioned adjacent to the card is acquired. With reference to the system of FIGS. 4A-4B, camera 422 of mobile device 406 acquires an image of sample 404 positioned adjacent to card 402.

In procedure 604, raw data of the acquired image is processed in a RGB color-space by cropping and rectifying pixel representations of the color chart, the sample, and the at least one grayscale stripe in the image. In one embodiment, correcting the pixel representation of the color chart in the image comprises determining a box defining each color square of the pixel representation of the color chart, determining for each box, an average RGB value for pixels inside the box, where the average RGB value omits RGB values of pixels situated at the border between two adjacent color squares of the pixel representation of the color chart, and assigning each respective pixel of each color square the average RGB value. With reference to the system of FIGS. 4A-4B, processor 420 of mobile device 406 processes the acquired image in the RGB color-space. Alternatively, mobile device 406 provides the acquired raw image data to server 410 via respective transceivers 428 and 434, and server 410 processes the acquired image in the RGB color-space.

In procedure 606, reference data corresponding to the color chart of the card, reference data corresponding to the at least one grayscale area of the card, are retrieved. Optionally, characteristic data corresponding to the card is retrieved as well. The reference data for the color chart of the card may include colorimetric data as well as RGB coordinates for the color chart. Similarly, the reference data for the at least one grayscale area may include colorimetric data as well as RGB coordinates for the at least one grayscale area. With reference to the system of FIGS. 4A-4B, server 410 uses card identifier 418 to retrieve from storage device 408 the reference data for color chart 414, reference data for grayscale stripes 440A, 440B, 440C, and 440D, and card characteristic data corresponding to card 402 via transceiver 434.

In procedure 608, a grayscale correction is performed to the pixel representation of the color chart and the pixel representation of the sample using a grayscale correction transformation between the pixel representation of the at least one grayscale area and the reference coordinates for the at least one grayscale area. In one embodiment, the grayscale correction transformation is based on the RGB reference coordinates for the at least one grayscale area. The grayscale correction is performed to RGB coordinates for the pixel representation of the color chart and RGB coordinates for the pixel representation of the sample. In one embodiment, performing the grayscale correction comprises performing a first grayscale correction step applied to the pixel representation of the at least one grayscale area, and performing a second grayscale correction step applied to the pixel representation of the color chart and the sample. In another embodiment, the grayscale corrections are performed in accordance with the method illustrated in FIG. 6B, and which is described in greater detail below. With reference to the system of FIGS. 4A-4B, server 410 builds a grayscale correction transformation between the pixel representation of grayscale stripes 440A, 440B, 440C, and 440D and the reference data for grayscale stripes 440A, 440B, 440C, and 440D. Server 410 performs a grayscale correction to the pixel representation of color chart 414 and the pixel representation of sample 404 using the grayscale correction transformation between the pixel representation of grayscale stripes 440A, 440B, 440C, and 440D and the reference data for grayscale stripes 440A, 440B, 440C, and 440D. The reference data may the reference RGB coordinates for grayscale stripes 440A, 440B, 440C, and 440D, and the grayscale correction may be performed in the RGB color space.

In procedure 610, a set of colorimetric coordinates for the sample is estimated by applying to the grayscale corrected pixel representation of the sample, a transformation between the grayscale corrected pixel representation of the color chart and the colorimetric reference data corresponding to the color chart. With reference to the system of FIGS. 4A-4B, server 410 estimates a set of colorimetric coordinates for sample 404 by applying to the grayscale corrected pixel representation of sample 404, a transformation between the grayscale corrected pixel representation of color chart 414 and the colorimetric reference data corresponding to color chart 414.

In procedure 612, the colorimetric coordinates of the sample in the device independent color space are converted to a set of RGB coordinates, thereby detecting the RGB color coordinates for the sample. In one embodiment, the RGB color coordinates are within a color gamut of a dyeing machine. One or more characteristics of a dyeing substrate, such as a thread, may also be applied to any of the converting or estimating steps. With reference to the system of FIGS. 4A-4B, server 410 converts the colorimetric coordinates of sample 404 to a RGB color space.

In procedure 614, the detected RGB color space coordinates of the sample are stored. The detected color in the RGB color space coordinates may be subsequently displayed. Additionally, the detected color in the RGB color space coordinates may be subsequently converted to a subtractive color space, such as CMY, CMYK, or CMYK+ and provided for dyeing a substrate, accordingly. With reference to the system of FIGS. 4A-4B, server 410 stores the detected RGB color space coordinates at storage device 408, and provides the detected RGB color to mobile device 406 via respective transceivers 428 and 434, and network 436. Mobile device 406 displays the detected RGB color at user interface 424. Server 410 additionally converts the detected RGB color a subtractive color space, and provides the detected color to dyeing machine 412.

In procedure 616, a substrate is dyed according to the detected RGB coordinates. With reference to the system of FIG. 4A, dyeing machine 412 dyes a thread according to the detected color for sample 404.

In one embodiment of any of the above disclosed techniques, a warning is indicated when a color is outside the gamut of any of the respective dyeing machines 112 and 412, and respective color calibrating cards 102 and 402 of FIGS. 1A and 4A. Typically, the color gamut of any of cameras 122 and 422 of mobile devices 106 and 406, is larger than the gamut of respective dyeing machines 112 and 412 and calibrating cards 102 and 402, i.e. such as when using CMY or CMYK ink sets. Thus, an image of a sample whose color is outside the dyeing gamut of dyeing machines 112 and 412 and calibration cards may be captured and detected.

Figure 6B:
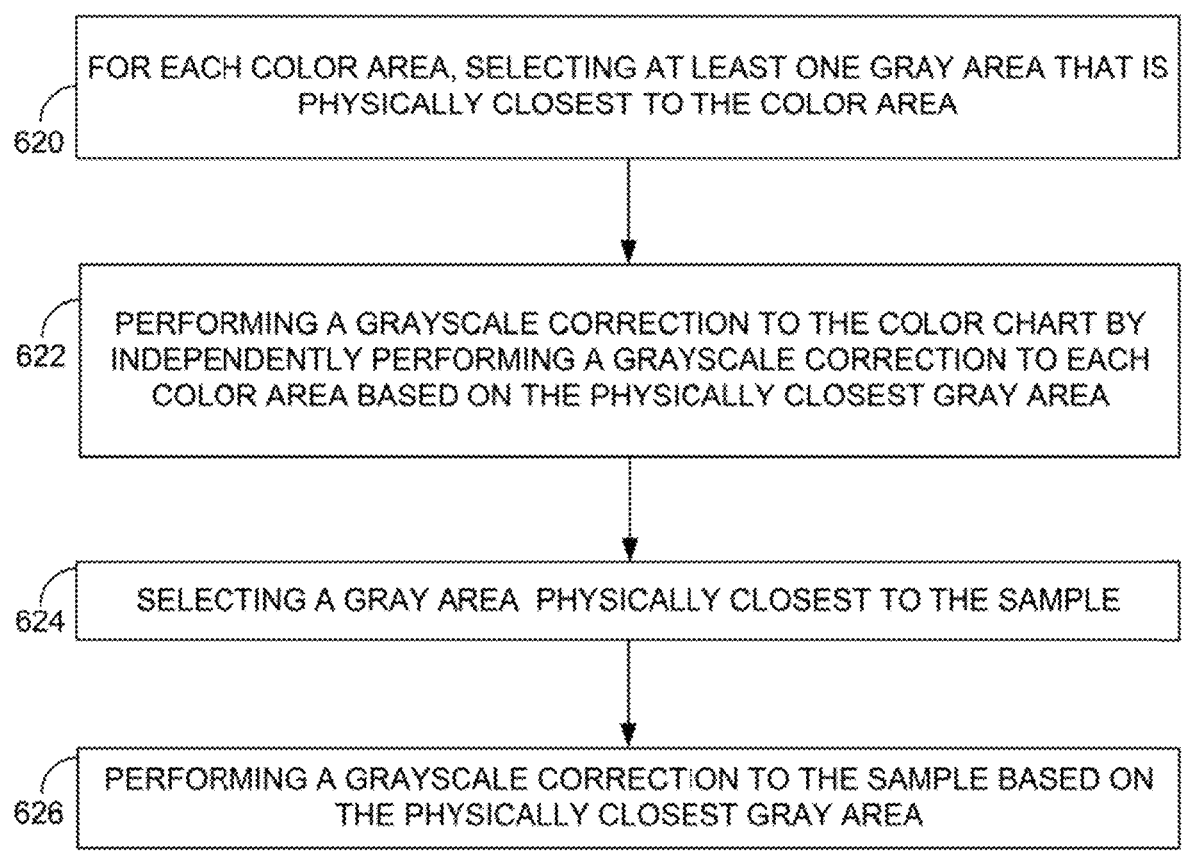
FIG. 6B is a schematic illustration of a detailed method for performing a grayscale correction, in accordance with a further embodiment of the disclosed techniques.

In one embodiment, the grayscale correction of step 608 (above) is performed independently for each colored area of the color chart. Reference is now made to FIG. 6B, which is a schematic illustration of a detailed method for performing the grayscale correction of step 608 (FIG. 6A), in accordance with a further embodiment of the disclosed techniques.

In procedure 620, for each colored area of the color chart, at least one of the gray areas that is physically closest to the colored area is selected. With reference to the system of FIGS. 4A-4C, for each color square of color chart 414, mobile device 406 and/or server 410 selects at least one gray area that is physically closest to the color square, e.g. gray area 440B(1) is selected as physically closest to color square $C_3(2,1)$, gray areas 440B(2) and 440C(2) are selected as physically closest to color square $C_3(5,1)$, and gray areas 440A(3), 440B(3), and 440C(3) are selected as physically closest to color square $C_3(3,3)$.

In procedure 622, a grayscale correction is performed to the pixel representation of the colored area in the RGB color space based on the pixel representation of the physically closest gray area. In this manner, a grayscale correction is performed independently to each colored area of the pixel representation of the color chart in the RGB color-space, thereby performing a grayscale correction for the color chart. The grayscale correction corrects for illumination irregularities and distortions in the acquired image. With reference to the system of FIGS. 4A-4C, mobile device 406 and/or server 410 performs the grayscale correction to color square $C_3(2,1)$ based on gray area 440B(1). Mobile device 406 and/or server 410 performs the grayscale correction to color square $C_3(5,1)$ based on gray areas 440B(2) and 440C(2). Mobile device 406 and/or server 410 performs the grayscale correction to color square $C_3(3,3)$ based on gray areas 440A(3), 4406(3), and 440C(3). By independently performing the grayscale correction to each of the color squares of color chart 414, the grayscale correction is performed for color chart 414.

In procedure 624, at least one of the at least one gray area that is physically closest to the sample is selected. With reference to the system of FIGS. 4A-4C, mobile device 406 and/or server 410 selects grayscale areas 440C(4) and 440D (4) as physically closest to sample 404.

In procedure 626, based on the pixel representation of the at least one gray area that was selected as physically closest to the sample, a grayscale correction is performed to the pixel representation of the sample in the RGB color space. With reference to the system of FIGS. 4A-4C, mobile device 406 and/or server 410 perform the grayscale correction to the pixel representation of sample 404 based on grayscale areas 440C(4) and 440D(4).

Once the image has been corrected based on the grayscale correction, the remaining steps for detecting the color of sample (e.g. steps 610 through 616) may proceed as described above and with respect to FIG. 6A.

In accordance with another embodiment of the disclosed techniques, a mobile application is provided that displays an image with one or more candidate colors, such as may be determined in accordance with a dominance factor or frequency factor, and the like. The user is prompted to select one or more of the candidate colors, and the mobile application dynamically builds a respective color swatch corresponding to each selected candidate color. The color swatch is extracted from a color library spanning a color gamut for a thread dyeing machine. Each respective color swatch is displayed alongside the selected candidate color. The user is prompted to choose from each respective color swatch, a color matching each selected candidate color. The matched colors are stored at a storage device. Subsequently, a substrate may be dyed according to the matching color. For example, a thread dyeing machine may dye a thread according to the matching color. If multiple colors are matched, different sections of a single thread may be dyed according to each of the multiple matched colors, such that subsequently embroidering a fabric with the dyed thread yields a graphic depiction of the image.

Figure 7A:
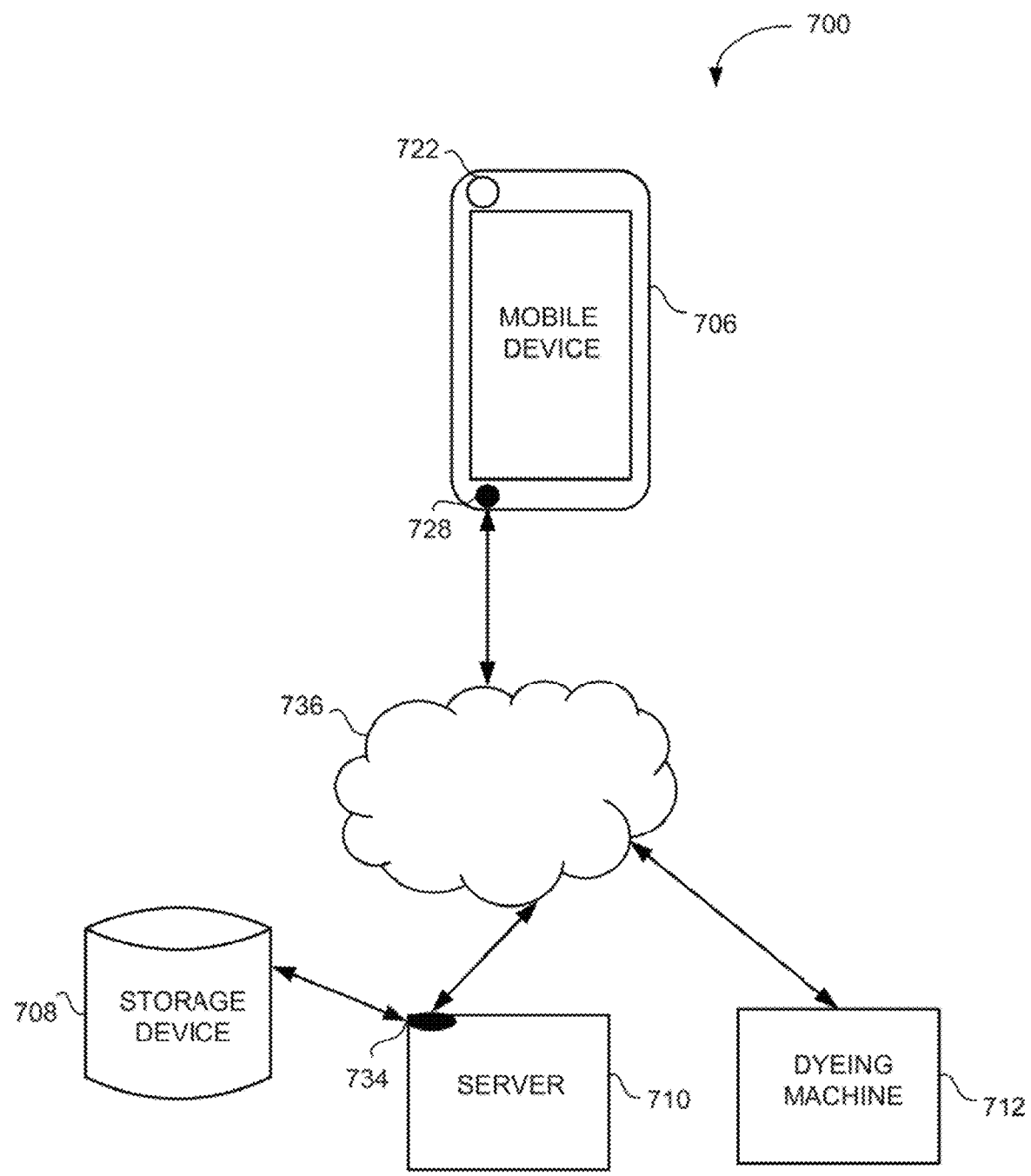
FIGS. 7A-7C are schematic illustrations of a color detection system, in accordance with another embodiment of the disclosed techniques.
Figure 7B:
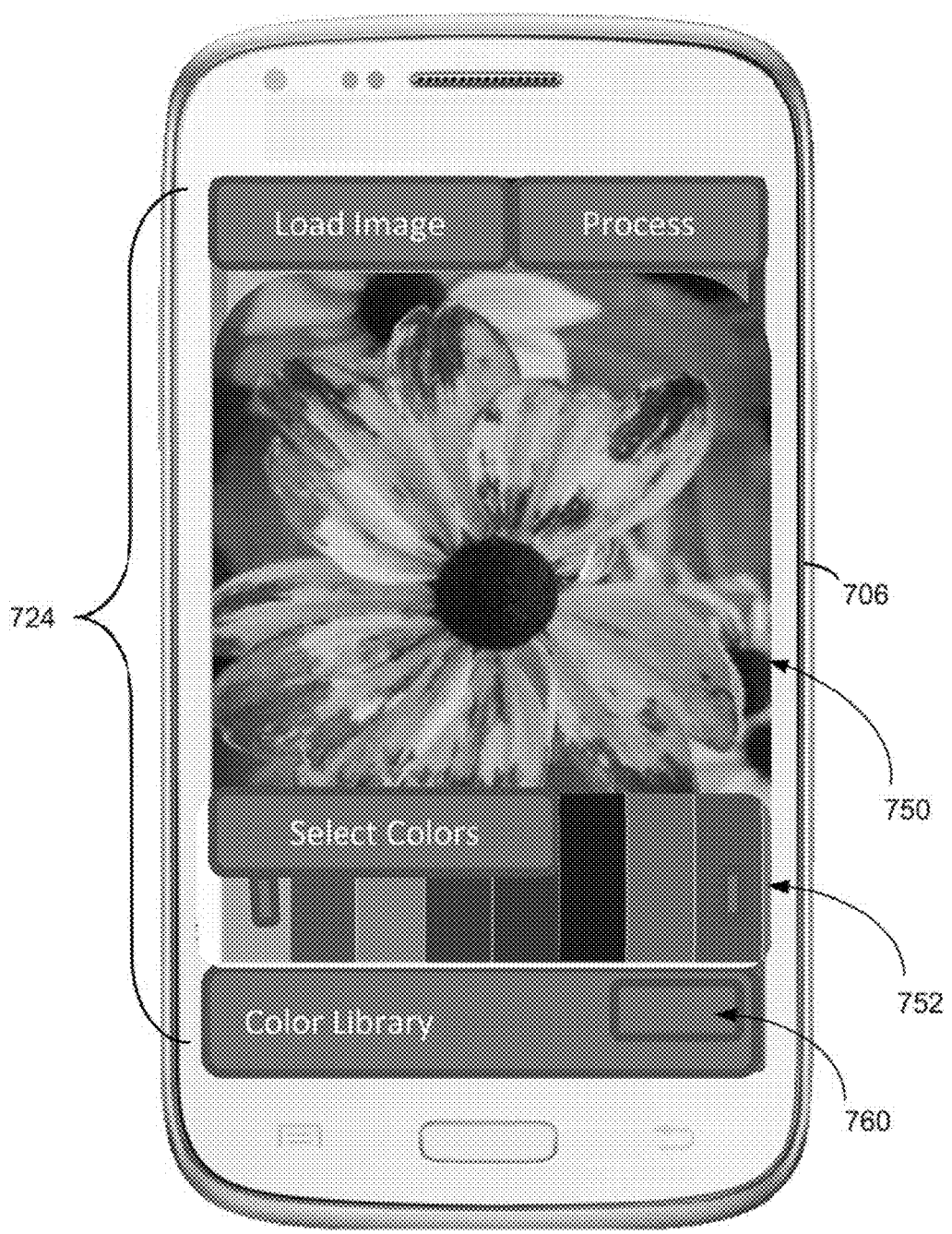
Figure 7C:
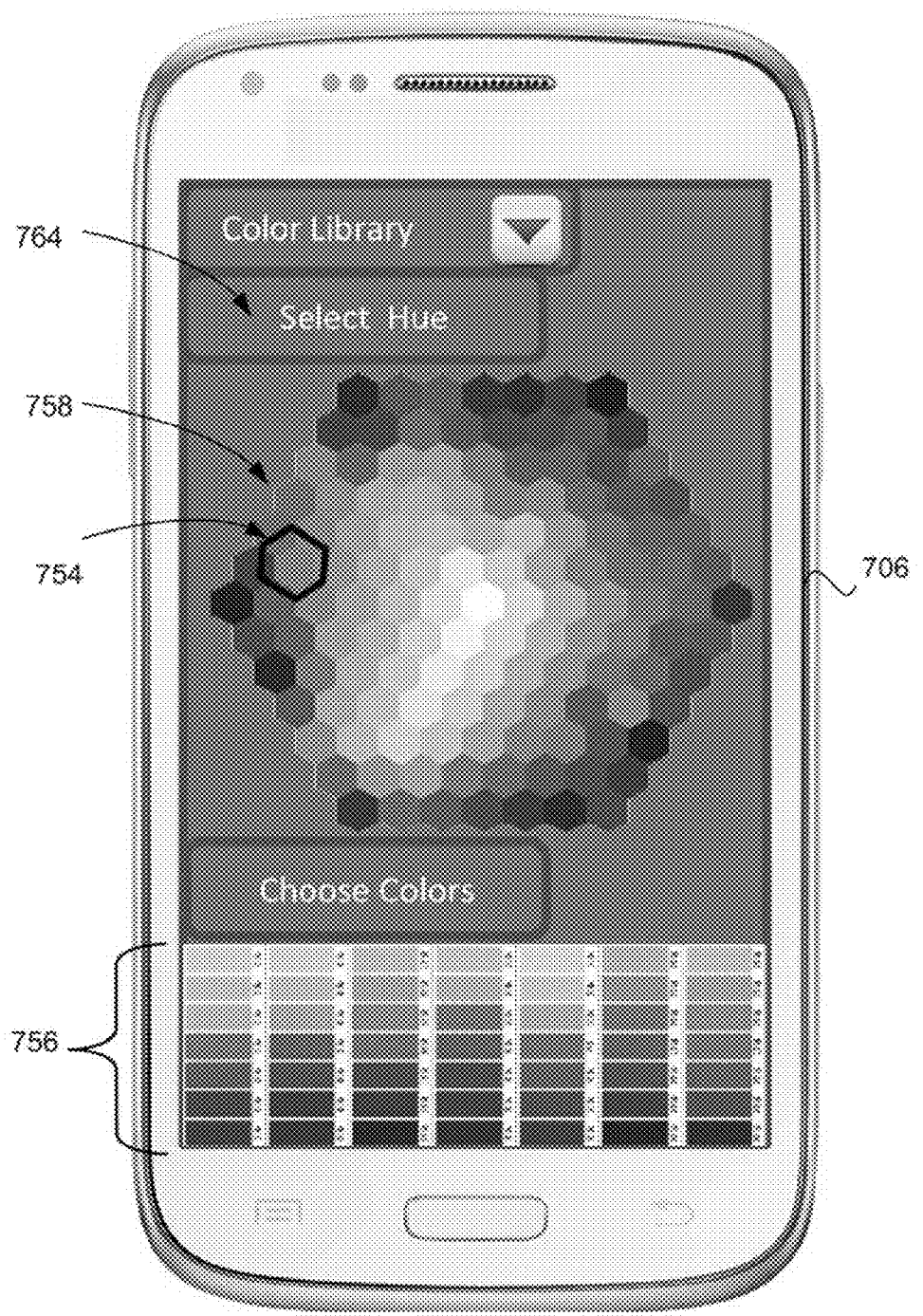

Reference is now made to FIGS. 7A-7C, which are schematic illustrations of a color detection system 700, in accordance with another embodiment of the disclosed techniques. FIG. 7A illustrates a system 700 including a mobile device 706, a storage device 708, a server 710, a network 736, and a dyeing machine 712. Dyeing machine 712 may be a thread dyeing machine.

The operation and componentry of mobile device 706 and server 710 may be represented by respective mobile device 106 and server 110, described above in FIGS. 10-1D. In particular, mobile device 706 and server 710 are provided with respective processors 720 and 730, memories 726 and 732, and transceiver 728, and 734 corresponding to respective processors 120 and 130, memories 126 and 132, and transceivers 128, and 134 of FIGS. 10-1D. Mobile device 706 is additionally provided with a user interface 724 and camera 722, corresponding to UI 124 and camera 122 of FIG. 10. User interface 724 is configured to display content and receive indications from a user via one or more sensors integrated with UI 724, including any combination of touch sensitive sensors, pressure sensitive sensors, audio and visual sensitive sensors, and the like. Mobile device 706 and server 710 are operative to communicate with each other via respective transceivers 728 and 734 and network 736. Each of processors 720 and 730 of respective mobile device 706 and server 710 are operative to store one or more program code instructions and data, such as images and processed images, in memories 726 and 732. Execution of the program code instructions by processors 720 and 730 may result in the performance of any of the procedures described herein.

Mobile device 706 is communicatively coupled to server 710 via network 736 that may include any combination of a public network such as the Internet, as well as private, local and remote networks. Server 710 is in communication with storage device 708, and with dyeing machine 712 via transceiver 734. Optionally, server 710 communicates with dyeing machine 712 via network 736.

Referring to FIG. 7B while still referring to FIG. 7A, a display of a color image 750 with multiple candidate colors 752 at user interface 724 of mobile device 706 is shown, in accordance with an embodiment of the disclosed techniques. Mobile device 706 obtains color image 750 using conventional methods. For example, a user may acquire color image 750 via camera 722, or the user may select and retrieve color image 750 from memory 726 of mobile device 706, or the user may select and retrieve color image 750 from server 710 via network 736. Mobile device 706 identifies at least one candidate color 752 associated with color image 750. In one embodiment, the one or more candidate colors 752 are associated with color image 750 in accordance with a color dominance factor of color image 750. In another embodiment, the one or more candidate colors 752 are associated with color image 750 in accordance with a color frequency factor of color image 750. The one or more candidate colors 752 may be identified either by mobile device 706, or alternatively by server 710 and subsequently provided to mobile device 706. Mobile device 706 displays color image 750 with the one or more candidate colors 752 at user interface 724.

Mobile device 706 detects a designation of at least one of the displayed candidate colors 752. For example, a user may select one or more of the candidate colors via touch, keyboard selection, electronic mouse, electronic pen and the like. In one embodiment, mobile device 706 displays at user interface 724 a prompt 760 allowing the user to select a color library from a choice of multiple color libraries, such as multiple Spot color libraries, including but not limited to Pantone, Toyo, RAL System, WGSN. Mobile device 706 detects a user selection of one of the color libraries via user interface 724.

Mobile device 706 provides the one or more designated candidate colors to server 710, and optionally the selected color library, via respective transceivers 728 and 734 and network 736. Server 710 retrieves the selected color library from storage device 708. Server 710 dynamically builds a respective color swatch corresponding to each designated candidate color by extracting multiple colors from the retrieved color library. To dynamically build each respective color swatch corresponding to each of the designated candidate colors, server 710 may match each designated candidate color to the retrieved color library, and select multiple colors from within a predefined neighborhood of the matching color. Optionally, when matching each designated candidate color to the retrieved color library, server 710 may account for a dyeing substrate type, such as a type of thread for subsequent dyeing. Server 710 provides the respective color swatch corresponding to each designated candidate color to mobile device 706 via respective transceivers 728 and 734 and network 736. Mobile device 706 receives the respective color swatch from server 710.

Referring to FIG. 7C while still referring to FIG. 7A, an exemplary display of one designated candidate color 754 together with a respective color swatch 756 is shown. For each designated candidate color, mobile device 706 displays each respective color swatch 756 with the corresponding designated candidate color 754 at user interface 724. In the implementation illustrated in FIG. 7C, the designated candidate color 754 is a shade of green, corresponding to a green colored portion of color image 750 shown in FIG. 7A, and the respective color swatch 756 is a 7×7 array of 49 different shades of green, ranging across from yellow-green to blue-green, and ranging vertically from lighter shades to darker shades of green. It may be noted that the configuration and size of color swatch 756 is exemplary only, and color swatch 756 may have fewer or more numerous colors than shown in FIG. 7C. Similarly, the colors color swatch 756 may be arranged differently, for example, in a circular shape, oval shape, and the like. Optionally, mobile device 706 displays each respective designated candidate color 754 with respect to a color wheel 758 together with each respective color swatch 756. Optionally, mobile device 706 displays a prompt 764 respective of color wheel 758 that allows the user to adjust the hue of the designated candidate color 754. When the hue is adjusted thus, mobile device 706 may update color swatch 756 to correspond to the adjusted hue, and display the updated color swatch 756. Mobile device 706 displays a prompt 762 allowing the user to select one of the colors from color swatch 756 that matches designated candidate color 754. Mobile device 706 stores the selected matching color at memory 726. Alternatively, mobile device 706 provides the selected matching color to server 710 via respective transceivers 728 and 734, and network 736. Server 710 then stores the selected matching color at storage device 708.

Subsequently, server 710 provides the matching color to dyeing machine 712, and a substrate (not shown) is dyed in accordance with the selected matching color. For example, the substrate may be a thread, and dyeing machine 712 may be a thread dyeing machine. Thread dyeing machine 712 may dye the thread according to the matched color.

Figure 8:
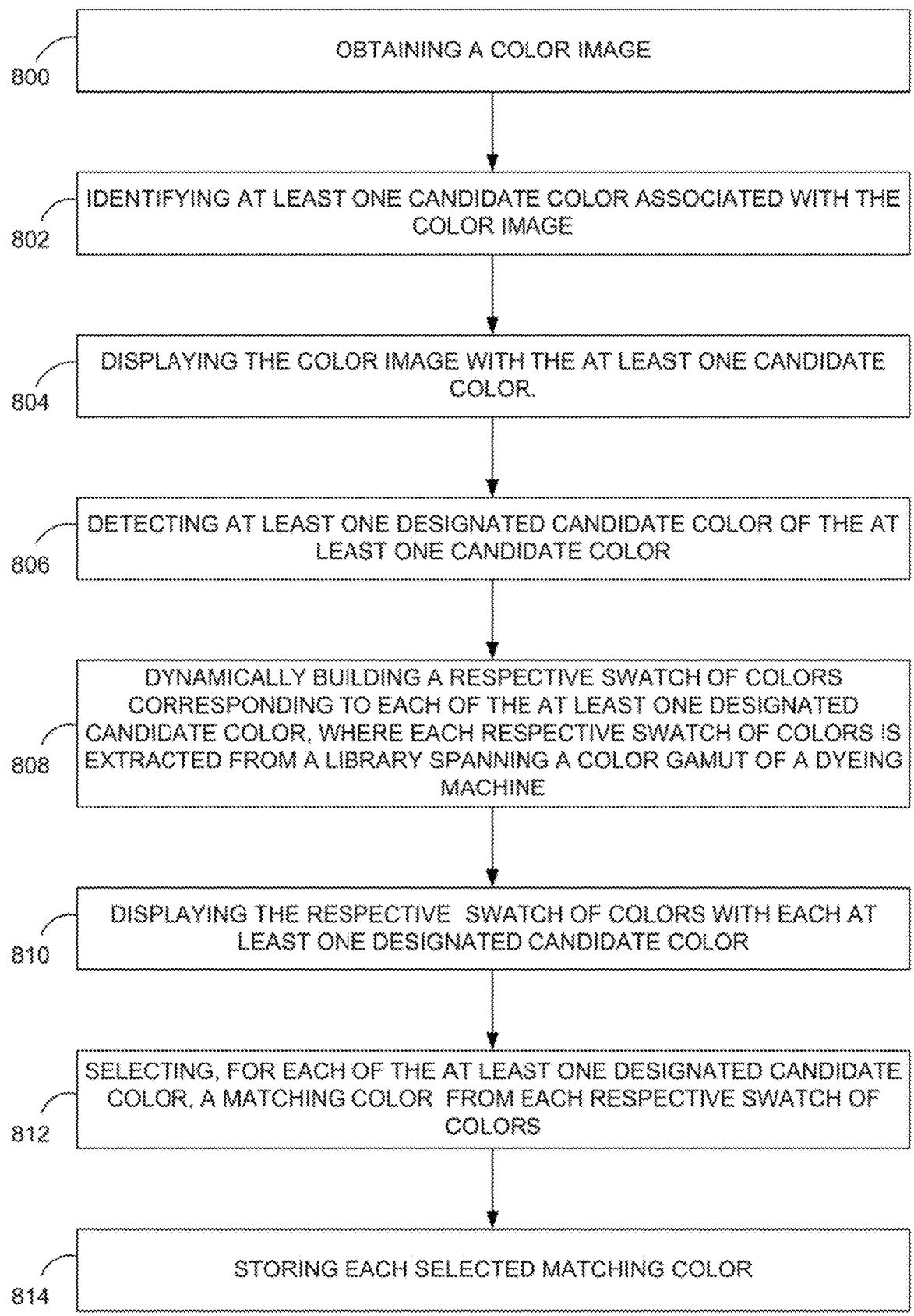
FIG. 8 is a schematic illustration of a method for detecting a color of a sample, in accordance with a further embodiment of the disclosed techniques.

A description of a method for selecting a color for a dyeing machine now follows. Reference is now made to FIG. 8, which is a schematic illustration of a method for selecting a color for a dyeing machine in accordance with another/a further embodiment of the disclosed technique.

In procedure 800, a color image is obtained. With reference to FIGS. 7A-7C, mobile device 706 obtains a color image 750.

In procedure 802, at least one candidate color associated with the color image is identified. In one embodiment, identifying the at least one candidate color associated with the color image includes identifying in accordance with a color dominance factor of the color image. In another embodiment, identifying the at least one candidate color associated with the color image includes identifying in accordance with a color frequency factor of the color image. With reference to FIGS. 7A-7C, processor 720 of mobile device 706 identifies at least one candidate color 752 associated with color image 750.

In procedure 804, the color image is displayed with the at least one candidate color. With reference to FIGS. 7A-7C, mobile device 706 displays color image 750 with the at least one candidate color 752.

In procedure 806, at least one designated candidate color of the at least one candidate color is detected. In one embodiment, a prompt is displayed for allowing the selection of a color library from a choice of multiple color libraries. With reference to FIGS. 7A-7C, mobile device 706 detects that at least one of the displayed candidate colors 752 was designated.

In procedure 808, a respective color swatch corresponding to each of the at least one designated candidate color is dynamically built, where the respective color swatch is extracted from a color library. In one embodiment, the color library corresponds to the user selection of the color library from the choice of multiple color libraries via the prompt. In another embodiment, dynamically building the respective color swatch corresponding to each of the at least one designated candidate color includes selecting from the color library, multiple colors from a neighborhood of each of the at least one designated candidate color. In a further embodiment, dynamically building the respective color swatch corresponding to each of the at least one designated candidate color includes accounting for a dyeing substrate type, such as a type of thread. With reference to FIGS. 7A-7C, processor 730 of server 710 dynamically builds a respective color swatch 756 corresponding to each received designated candidate color 754.

In procedure 810, the respective color swatch is displayed with each of the at least one designated candidate color. In one embodiment, displaying each respective color swatch with each of the at least one designated candidate color further includes displaying each designated candidate color with respect to a color wheel. With reference to FIGS. 7A-7C, processor 720 of mobile device 706 displays the respective color swatch 756 with each of the at least one designated candidate colors at user interface 724.

In procedure 812, for each of the at least one designated candidate color, a matching color is selected from each respective color swatch. With reference to FIGS. 7A-7C, processor 720 of mobile device 706 detects a selection of a matching color from respective color swatch 756.

In procedure 814, each selected matching color is stored. With reference to FIGS. 7A-7C, processor 720 of mobile device 706 stores the selected matching color at memory 726.

In one embodiment, a substrate is dyed in accordance with the selected color matching at least one of the at least one designated candidate color. With reference to FIGS. 7A-7C, dyeing machine 712 dyes a substrate according to the matching color.

It will be appreciated by persons skilled in the art that the disclosed technique is not limited to what has been particularly shown and described hereinabove. Rather the scope of the disclosed technique is defined only by the claims, which follow.

What is claimed is:

1. A color detection system, comprising:
a card having printed thereon a color chart comprising multiple colored areas, and at least one grayscale area;
a camera configured to acquire an image of a sample positioned adjacent to said card, said image comprising a pixel representation of said sample, a pixel representation of said color chart, and a pixel representation of said at least one grayscale area;
at least one storage device configured to store reference data corresponding to said color chart, and reference coordinates for said at least one grayscale area; and
at least one processor configured to:
perform a grayscale correction to said pixel representation of said color chart and said pixel representation of said sample using a grayscale correction transformation between said pixel representation of said at least one grayscale area and said reference coordinates for said at least one grayscale area,
estimate a set of colorimetric coordinates for said sample by applying to said grayscale corrected pixel representation of said sample, a transformation between said grayscale corrected pixel representation of said color chart and said reference data corresponding to said color chart, and
convert said estimated set of colorimetric coordinates for said sample to a set of RGB coordinates for said sample.

2. The color detection system of claim 1, wherein said reference coordinates for said at least one grayscale area comprise colorimetric reference data and corresponding reference RGB coordinates for said at least one grayscale area, and wherein said reference data corresponding to said color chart comprise colorimetric reference data and corresponding reference RGB coordinates for said color chart, wherein said grayscale correction is based on said reference RGB coordinates for said at least one grayscale area and said reference RGB coordinates for said color chart.

3. The color detection system of claim 1, wherein said color chart spans a color gamut of a dyeing machine and wherein said at least one processor is further configured to provide said set of RGB coordinates for said sample to said dyeing machine, wherein said dyeing machine is configured to dye a substrate according to said set of RGB coordinates for said sample.

4. The color detection system of claim 1, wherein said at least one grayscale area displays a gradient of different gray shades.

5. The color detection system of claim 4, wherein said at least one grayscale area comprises multiple grayscale stripes framing said color chart.

6. The color detection system of claim 1, wherein said card is provided with a cutout portion disposed flush against said color chart and said at least one grayscale area.

7. The color detection system of claim 6, wherein said cutout portion abuts a first and a second of said at least one grayscale area, wherein said first grayscale area is a different shade of gray than said second grayscale area.

8. The color detection system of claim 1, wherein said at least one processor is further configured to perform said grayscale correction to said pixel representation of said color chart by determining a shape defining each of said colored areas of said pixel representation of said color chart, and for each shape: determining average RGB coordinates for pixels positioned inside said shape, wherein RGB coordinates of pixels situated at a border of said shape and shapes of adjacent color areas are omitted from said average RGB coordinates, and assigning each pixel of said color area of said shape said average RGB coordinates.

9. The color detection system of claim 1, wherein said at least one processor is configured to perform said grayscale correction by applying a first grayscale correction step to said pixel representation of said at least one grayscale area, and applying a second grayscale correction to said pixel representation of said color chart and said pixel representation of said sample.

10. The color detection system of claim 1, wherein said at least one processor is further configured to perform said grayscale correction to said pixel representation of said color chart:
for each colored area of said pixel representation of said color chart:
select at least one of said at least one pixel representation of said grayscale area that is physically closest to said colored area, and perform a grayscale correction to RGB coordinates of said color area based on said selected at least one pixel representation of said grayscale area that is physically closest to said colored area,
thereby independently performing a grayscale correction to each of said colored areas, wherein said at least one processor is further configured to perform said grayscale correction to said pixel representation of said sample by selecting at least one of said at least one pixel representation of said gray area that is physically closest to said pixel representation of said sample, and basing said grayscale correction to said pixel representation of said sample on said selected at least one pixel representation of said gray area that is physically closest to said pixel representation of said sample.

11. A method for detecting a color of a sample, comprising:

obtaining an image of a sample positioned adjacent to a card having printed thereon a color chart comprising multiple colored areas, and at least one grayscale area, said image comprising a pixel representation of said sample, a pixel representation of said color chart, and a pixel representation of said at least one grayscale area;

performing a grayscale correction to said pixel representation of said color chart and said pixel representation of said sample using a grayscale correction transformation between said pixel representation of said at least one grayscale area and reference coordinates for said at least one grayscale area;

estimating a set of colorimetric coordinates for said sample by applying to said grayscale corrected pixel representation of said sample, a transformation between said grayscale corrected pixel representation of said color chart and reference data corresponding to said color chart; and converting said estimated set of colorimetric coordinates for said sample to a set of RGB coordinates for said sample.

12. The method of claim 11, wherein said reference coordinates for said at least one grayscale area comprise colorimetric reference data and corresponding reference RGB coordinates for said at least one grayscale area, and wherein said reference data corresponding to said color chart comprise colorimetric reference data and corresponding reference RGB coordinates for said color chart, and wherein said grayscale correction transformation is based on said reference RGB coordinates for said at least one grayscale area.

13. The method of claim 11, further comprising providing said set of RGB coordinates for said sample to a dyeing machine, wherein said color chart spans a color gamut of said dyeing machine, and wherein said dyeing machine is configured to dye a substrate according to said set of RGB coordinates for said sample.

14. The method of claim 11, further comprising performing said grayscale correction by applying a first grayscale correction step to said pixel representation of said at least one grayscale area, and applying a second grayscale correction to said pixel representation of said color chart and to said pixel representation of said sample.

15. The method of claim 11, wherein said at least one grayscale area displays a gradient of different gray shades.

16. The method of claim 11, further comprising performing said grayscale correction to said pixel representation of said color chart by determining a shape defining each of said colored areas in said pixel representation of said color chart, and for each shape: determining average RGB coordinates for said pixels positioned inside said shape, wherein RGB coordinates of said pixels situated at a border of said shape and shapes of adjacent color squares are omitted from said average RGB coordinates, and assigning each pixel of said colored area of said shape said average RGB coordinates.

17. The method of claim 11, wherein performing said grayscale correction to said pixel representation of said color chart comprises:

for each colored area in said pixel representation of said color chart:
selecting at least one of said pixel representation of said at least one grayscale area that is physically closest to said colored area, and performing a grayscale correction to RGB coordinates of said colored area based on said selected pixel representation of said at least one grayscale area that is physically closest to said colored area, thereby independently performing a grayscale correction to each of said colored areas, and wherein performing said grayscale correction to said pixel representation of said sample comprises selecting at least one of said pixel representation of said at least one gray area in said image that is physically closest to said pixel representation of said sample, basing said grayscale correction to said pixel representation of said sample on said selected pixel representation of said at least one gray area that is physically closest to said pixel representation of said sample.

* * * * *